US008577775B1

(12) United States Patent
Gerber

(10) Patent No.: US 8,577,775 B1
(45) Date of Patent: Nov. 5, 2013

(54) SYSTEMS AND METHODS FOR MANAGING INVESTMENTS

(76) Inventor: Sander Gerber, New York, NY (US)

( * ) Notice: Subject to any disclaimer, the term of this patent is extended or adjusted under 35 U.S.C. 154(b) by 0 days.

(21) Appl. No.: 13/601,386

(22) Filed: Aug. 31, 2012

(51) Int. Cl.
*G06Q 40/00* (2012.01)

(52) U.S. Cl.
USPC ........................................ 705/36 R

(58) Field of Classification Search
USPC ........................................ 705/36 R
See application file for complete search history.

(56) References Cited

U.S. PATENT DOCUMENTS

| | | | |
|---|---|---|---|
| 6,003,018 A | 12/1999 | Michaud et al. | |
| 6,564,191 B1 | 5/2003 | Reddy | |
| 7,904,368 B2 | 3/2011 | Weinstein et al. | |
| 2002/0178096 A1 | 11/2002 | Marshall | |
| 2009/0119226 A1 | 5/2009 | Kurczek et al. | |
| 2009/0228318 A1* | 9/2009 | Ara et al. | 705/7 |
| 2011/0016060 A1* | 1/2011 | Korzinin | 705/36 R |
| 2012/0036086 A1* | 2/2012 | Caputo et al. | 705/36 R |

OTHER PUBLICATIONS

Alloway, JPMorgan loss stokes risk model fears, Financial Times, May 13, 2012, 3 pages.
Anscombe's quartet, Wikipedia—the free encyclopedia, accessed on Aug. 28, 2012 from http://en.wikipedia.org/wiki/Anscombe%27s_quartet, 2 pages.
Correlation and Dependence, Wikipedia—the free encyclopedia, accessed on Aug. 28, 2012 from http://en.wikipedia.org/wiki/Correlation_and_dependence, 8 pages.
Krawcheck, JPMorgan shows fighting complexity is futile, May 23, 2012, 3 pages.
Ritholtz, JPMorgan's debacle and its parallels to AIG, The Washington Post, May 19, 2012, 3 pages.
Sommer, Before Leaping, Listen to a Giant, The New York Times, May 19, 2012, 3 pages.
Hackman, Mean-Variance Portfolio Analysis and the Capital Asset Pricing Model, Course Notes, Georgia Institute of Technology, 2011, pp. 1-27.
Markowitz, Portfolio Selection, The Journal of Finance, 1952, pp. 77-91 , vol. 7, No. 1.
Markowitz, Portfolio Selection: Efficient Diversification of Investment, Chapters 1, 2, and 8, pp. 3-35 and 154-187, Blackwell Publishers, 1991.
Penacchi, Chapter 2 Mean-Variance Analysis in Theory of Asset Pricing, 2008, pp. 37-89, Pearson/Addison-Wesley.
Cukier et al., The Rise of Big Data, How It's Changing the Way We Think About the World, Foreign Affairs, May/Jun. 2013, pp. 28-40 (7 pages).

* cited by examiner

*Primary Examiner* — Shahid Merchant
*Assistant Examiner* — Cho Kwong
(74) *Attorney, Agent, or Firm* — Eric L. Sophir; Dentons US LLP

(57) ABSTRACT

The methods and systems described herein can identify meaningful relationships between actual positions within a portfolio of investments, as well as relationships to externalities. Based on the understanding that relationships between positions are not fixed over periods of time but can vary depending on recent external events, the methods and systems described herein can achieve a portfolio of investments that are least related to other investments within the portfolio (e.g., a diverse portfolio) and, if desired, least related to the overall market (e.g., a market neutral portfolio). The methods and systems described herein can filter performance data to evaluate and manage risk across a dynamic portfolio that includes numerous primary instruments and hedge instruments. The methods and systems described herein can also provide a diagnostic tool to monitor both risk and diversification (including relationships) by determining the actual amount of profit and loss and a diversity score for each investment.

15 Claims, 13 Drawing Sheets
(5 of 13 Drawing Sheet(s) Filed in Color)

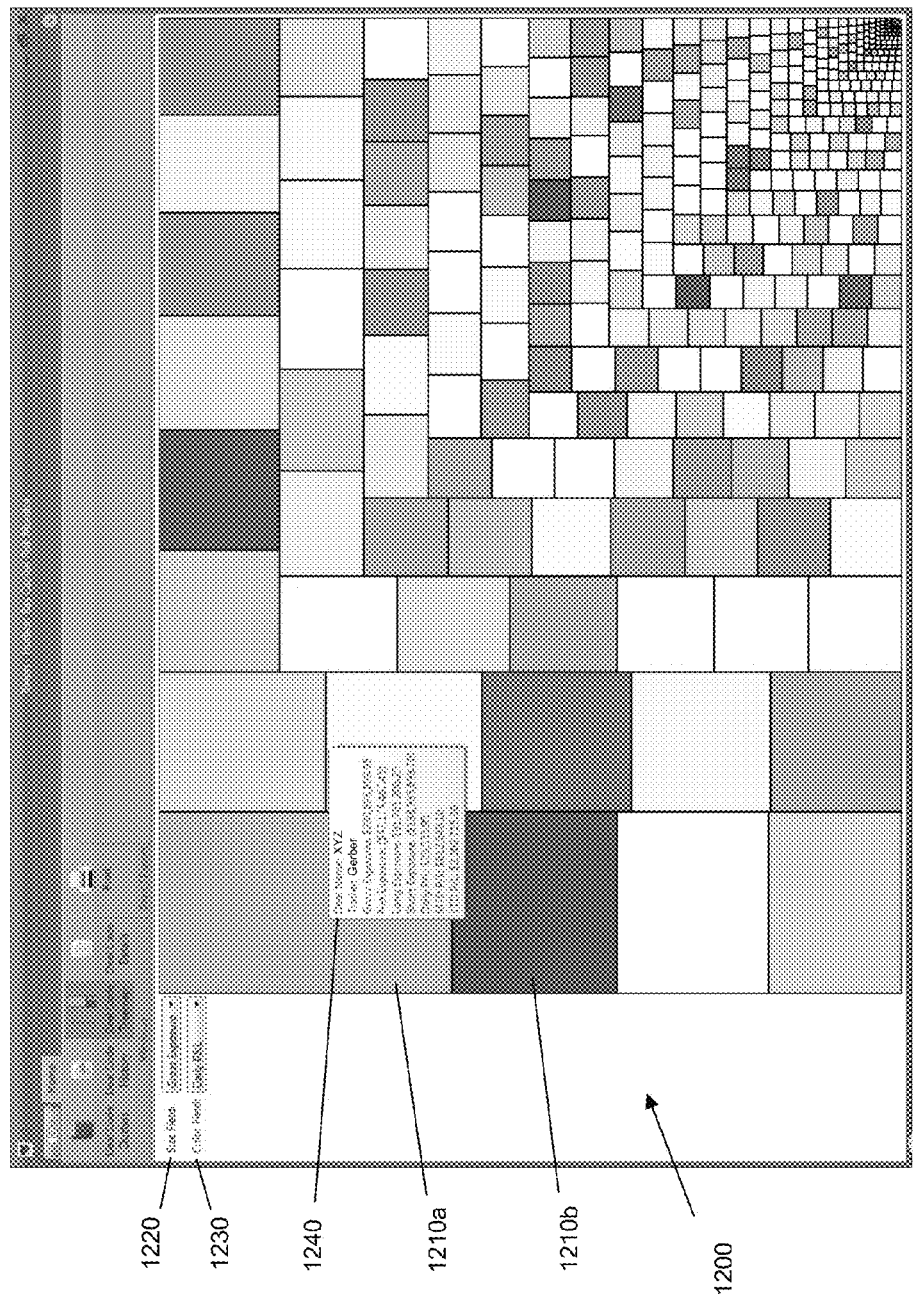

SYSTEMS AND METHODS FOR MANAGING INVESTMENTS

CROSS-REFERENCE TO RELATED APPLICATIONS

This application relates to U.S. patent application Ser. No. 13/601,310, entitled "SYSTEMS AND METHODS FOR MANAGING INVESTMENTS," filed Aug. 31, 2012, which is hereby incorporated by reference in its entirety.

FIELD OF THE INVENTION

This invention relates generally to systems and methods for monitoring and managing investments.

BACKGROUND

With the rise of hedge funds and other sophisticated investment strategies, the financial industry now seeks to perform analysis across a wider variety of asset classes, hedges relevant to particular assets, positions, sectors and markets, and on lesser-known relationships between or among these categories. Positions now include complex and sometimes multiple derivative hedges to mitigate risk. Derivative values decay over time and have various triggers and maturities. Thus, while the instruments and hedging techniques have become markedly more complex, existing portfolio and risk management tools lack the capability to properly assess the diversification of these complex positions, as well as the changing impact of external factors, and lack the ability to provide accurate high level views of performance and risk. In addition, due to the complexities of monitoring and managing these investments, it is challenging to identify new investments that will provide diversification benefits to the portfolio. Conventional risk assessment tools typically perform analysis on the current portfolio based on historical asset or securities relationships. These tools often rely on unstable factors that incorrectly assume that the future will look nearly identical to the past, giving a false sense of confidence in the riskiness and diversification of a dynamic portfolio that incorporates derivative instruments.

SUMMARY

In an attempt to better manage the uncertainties in a portfolio of investments, the systems and methods described herein establish a pro-active framework that can provide for portfolio construction and systematic assessment of each investment along with the ability to aggregate the investments to provide a firm-level view of performance and risk in order to maintain a diversified, non-concentrated portfolio. Investors conventionally have relied on covariance and correlation, but these statistics can conceal risk especially when a long-term trend undergoes a sudden or even gradual change.

The framework described herein enables optimal portfolio construction in a multi-asset, multi-portfolio manager environment. Further, the framework allows for portfolio risk analysis based on a flexible co-movement structure instead of a conventional correlation analysis. A building block of the framework is the ability to construct investments based on independent alpha baskets of primary and hedging positions. The framework can organize these investments and facilitate analysis using a set of recent, relevant data to determine actual performance of investments, assess diversity amongst investments, and identify previously hidden relationships in the portfolio in a timely and relevant manner. Such relationships can provide insight beyond the particular investments of the portfolio, often revealing buy-side trends in the marketplace.

The methods and systems described herein further attempt to overcome the deficiencies of the conventional methods and systems by attempting to identify meaningful relationships between actual positions within the portfolio or to externalities, while taking into account the fact that these relationships are temporal and constantly in flux. The methods and systems described herein can structure a portfolio of investments that is diversified and, if desired, least affected by the overall market. The methods and systems described herein can monitor portfolio diversification, filter the results of such monitoring, and evaluate and manage risk across a multitude of primary instruments and hedge instruments. The methods and systems described herein can also provide a diagnostic tool to monitor both risk and diversification (including relationships) by determining the actual amount of profit and loss, as well as a diversity score for each investment.

Additional features and advantages of various embodiments will be set forth in the description which follows, and in part will be apparent from the description. Other advantages will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The preferred embodiments of the present invention are illustrated by way of example and not limited to the following figures:

FIGS. 12a and 12b depict a treemap on a graphical user interface according to an exemplary embodiment.

DETAILED DESCRIPTION

Figure 1:
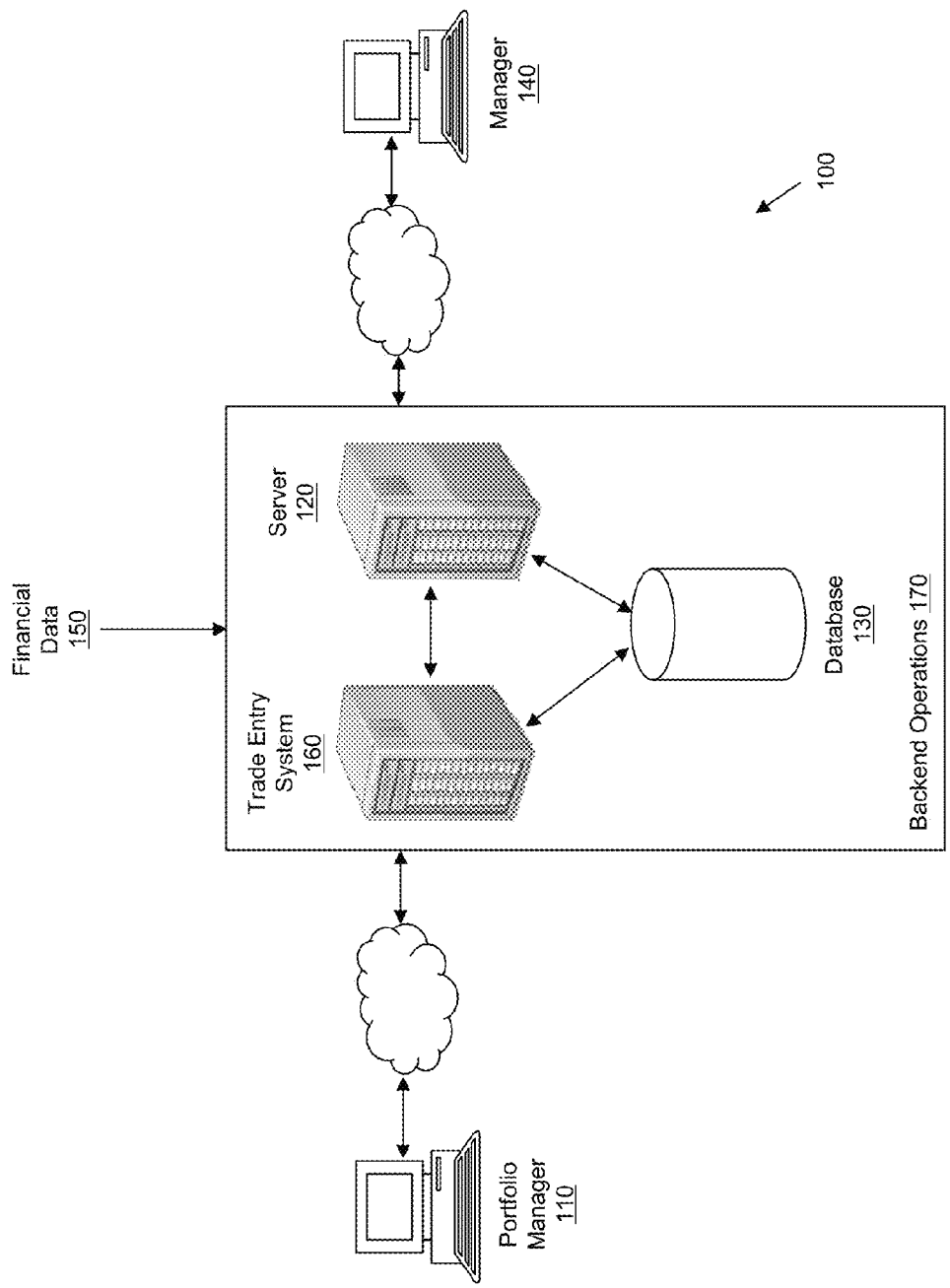
FIG. 1 depicts a system architecture according to an exemplary embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

The embodiments described herein attempt to lower volatility of an investment portfolio by indicating the level of diversification between independent investments. When managing multiple investments, it may be useful to see whether those investments are truly diversified as independent investments. So the embodiments described herein can provide a diagnostic tool for determining the diversification level and where the investments can be adjusted to improve the diversification. Where the investments appear to be related based upon recent movements in the market, the investor can be notified of the relationship so that the investments can be adjusted, thereby minimizing the risk of loss.

In an attempt to optimize profits, it is desirable to allocate assets in investments using a strategy that considers if (a) the investor has high conviction that the investment will be profitable, (b) an investment is hedged on its own and is independent of the investor's other investments, and (c) the investment has limited potential for loss. The movement of two investments over the last few days can provide an indication as to their independence of each other. Some conventional methods such as regression analysis may rely primarily on $R^2$ calculations, which use a straight line fit and requires a large number of data points to account for every position and movement over an extended period of time. But relationships in the financial markets often do not follow straight line relationships and can change over short term periods. When a relationship between two investments changes suddenly, a straight line fit of performance data may show a trend over the time period of substantially all performance data and ignore a recent and drastic change. By focusing on long term trends, $R^2$ calculations can be inadequate tools to measure correlation.

Moreover, conventional methods using $R^2$ calculations use many points of data for positions and movements, but some of these relationships may be considered "noise" that affects the correlation analysis. Accordingly, it can be desirable to eliminate any noise in the data (e.g., filter using certain parameters that may exclude data likely to erroneously skew an outcome) to get a better sense of the volatility and significance of the interaction between two investments.

In contrast to $R^2$ calculations, the methods and systems described herein use a cluster threshold analysis that accounts for actual historical relationships between positions in the portfolio, not just a historical value or price of a financial instrument involved in an investment. Over time, whether a short period of time (e.g., just a few days, such as 10 days) or a longer period of time (e.g., a year or more), the positions in the portfolio can change. Positions can be added or removed, and amounts allocated to each position can be increased or decreased. So the use of historical data in the cluster threshold analysis accounts for the changes in the primary positions as well as any hedging positions. As the positions vary over time the deal code profit/loss can be used to determine how these investments are related, even if the relationship has undergone only a recent change. By using the diagnostic tools described herein, an investor can identify positions of consequence that should be adjusted.

The use of deal code records in the cluster threshold analysis further allows a determination of relation and diversity of investments to determine an amount of risk in the investments. A deal code record is a record (e.g., identifier, grouping, block) of an investment idea for systematic analysis of the investment and its relationship to other investments. A deal code record can identify a position in a primary financial instrument as well as one or more positions in related hedging instruments. By analyzing each position and corresponding hedges as a deal code record, described in further detail below, the cluster threshold analysis can look at a relationship between positions over time, incorporating any relevant hedges, as opposed to just historical prices of the underlying financial instruments.

In order to minimize risk, it is desirable to obtain diversity amongst the positions in the portfolio, and it is challenging for a portfolio manager to rely only on a covariance calculation to assess diversity. In one example, an investor may have five long positions in stocks and a hedge having a short position in the S&P 500. Conventionally, the investor may attempt to calculate a covariance for the totality of the positions and hedge the positions accordingly. However, covariance and correlation can be difficult to calculate, can change quite often, and can be difficult to determine whether it is even accurate. Further, conventional covariance calculations use previous market prices, but do not account for the particular position sizes and derivative hedges, so those calculations cannot accurately assess risk. Also, because of the unpredictable nature of fluctuations in the market, covariance cannot be used to reliably predict the performance of an investment. If the long or short positions are not performing well, the covariance calculations will not properly indicate how to adjust one or more of the positions.

In order to determine the effectiveness of a hedge, the hedge can be considered along with the primary instrument and any other edges (e.g., compare a short position along with each of the long positions). Many hedge funds and risk analysis models may not accurately assess risk based upon conventional covariance and correlation calculations, so they may not be aware of whether a hedge is unsuccessful because of a particular position (e.g., a long position) or due to the covariance. But by pairing the related positions (e.g., a long position with a hedge position) in a deal code record, it can be easier to determine the performance and relationships. Each day, a profit or loss can be determined for each deal code record. It may be more appropriate to measure the performance (e.g., profit and loss) of the positions in the deal code record on a total basis, rather than individually assessing each long and short position.

The embodiments described herein provide systems and methods for filtering, constructing, hedging, evaluating, and managing risk in one or more investments using software and hardware capable of processing the large amounts of investment data input into the system. The software can be automated to conduct periodic or real-time analysis of positions, and optionally, can adjust the positions based upon the analysis. The software can also sort the analysis based on a degree of significance, such as identifying the most related positions in a portfolio.

Referring now to FIG. 1, an exemplary architecture of a system 100 is shown. At least one user (e.g., a manager, a portfolio manager, trader, or analyst) can communicate with backend operations 170, including a server 120, over a network using a computer 110, such as a personal computer, desktop computer, laptop computer, personal data assistant (PDA), mobile device (e.g., a cellular phone), tablet computer, telephone, smart phone, or any other computing device. The network can be a local area network, wide area network, WI-FI network, or any other type of connection between the server 120 and the computer 110. Although the computer 110 is described as being used by the portfolio manager, it is intended that the label of a portfolio manager is not limited to an entity that has a supervisory role, but rather can include any entity, such as a trader, analyst, or investor, and each entity can have its own computer 110 for interaction with the system 100. The exemplary embodiments described herein use the terms investor, trader, manager, portfolio manager, analyst, and user, though it is intended that these functions and roles can be performed by or on behalf of any entity that instructs, uses, or implements the methods and systems described herein. In the exemplary embodiment, the portfolio manager can identify and propose new investments.

The system 100 can also include a trade entry system 160, which can be a component of the server 120 or a separate, communicatively-coupled device, shown in the exemplary configuration in FIG. 1 as a separate server. The trade entry system 160 can allow the portfolio manager using computer 110 to submit a trade request or ticket, such as entering a new trade or otherwise revising or modifying a trade. The trade entry system 160 can also be configured to automatically submit a new trade ticket. The trade entry system 160 can also communicate with the server 120 and any other components of the system 100. Upon entry of a trade ticket into the trade entry system 160, the trade ticket can be transmitted for approval before execution of that trade. Alternatively, the trade entry system 160 can execute the trade request upon receipt of the ticket.

Figure 2:
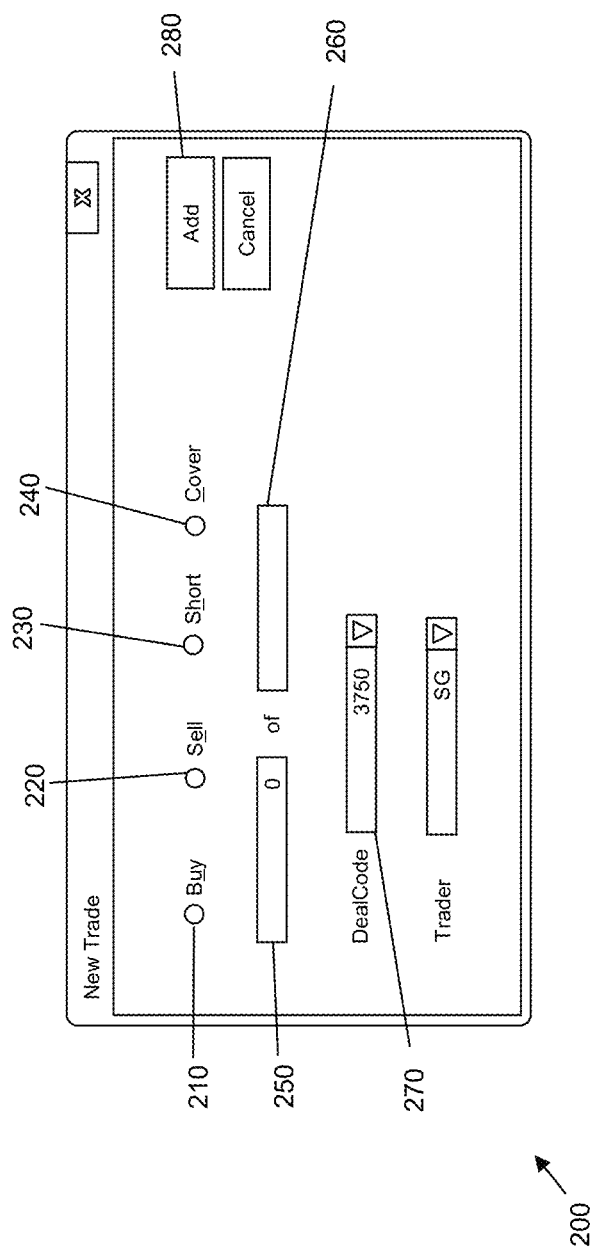
FIG. 2 depicts a graphical user interface according to an exemplary embodiment.

Referring to FIG. 2, a graphical user interface 200 for a trade ticket for use with the trade entry system 160 is shown. The graphical user interface 200 can be displayed on the computer 110 of the portfolio manager and can communicate with the trade entry system 160 to initiate the requested trade. Although the exemplary options may be shown on the graphical user interface 200 as fields, drop-down menus, radio buttons, or other buttons, it is understood that the options may be presented in any form on the graphical user interface 200.

The graphical user interface 200 displays various fields for completion or modification by the portfolio manager. For example, the portfolio manager may select the type of trade, including buy 210, sell 220, short 230, or cover 240. The portfolio manager may also select a volume 250, which also may be expressed as a monetary figure, of a certain security or instrument 260. In completing the ticket, the portfolio manager may select a deal code record 270, discussed in further detail below, that is associated with this request. When the ticket has been completed, the portfolio manager can select an "add" button 280 to submit the ticket for execution. Upon submission of the ticket, the server 120 can process the trade as being associated with selected deal code record 270 and store the trade information accordingly.

At least one manager, such as a chief risk officer or a chief investment manager, can communicate with the server 120 over a network using a computer 140, such as a personal computer, desktop computer, laptop computer, personal data assistant (PDA), mobile device (e.g., a cellular phone), tablet computer, telephone, smart phone, or any other computing device. The network can be a local area network, wide area network, WI-FI network, or any other type of connection between the server 120 and the computer 140. In the exemplary embodiment, the manager can determine asset allocation and evaluate risk of an investment strategy. The manager may reduce an allocation or impose a different hedging strategy based on an evaluation of diversification and risk.

The server 120 can transmit and receive information from the portfolio manager's computer 110 and the manager's computer 140, and can receive financial data 150 from additional sources. For example, financial data 150 can include real-time updates on stock prices or other market data. The financial data 150 can be imported directly into the server 120, or alternatively, computer 110 and computer 140 can transmit the financial data 150 to the server 120. The financial data 150 can include trade data from a data feed or other financial data monitoring service. In one embodiment, in order to expedite the importation and updating of records, the received financial data (e.g., each trade) can be associated with a deal code record. This association of the trade and hedges on that trade with the same deal code record can provide further granularity for a range of positions on that deal code record.

The server 120 can store information in a database 130. The database 130 can be connected to the server 120 using a network, or alternatively, the server 120 and the database 130 can be integrated as a single computing device. It is also understood that the server 120 and the database 130 can each comprise multiple devices. The database 130 can manage (e.g., store, maintain, delete, search, and retrieve) records regarding financial performance data, analysis regarding the performance data, portfolio managers, and other related information. The database 130 can also include records regarding deal code records. The database 130 can store time-series data including, but not limited to, positions, profit and loss, exposure, and sensitivities to drivers of theoretical valuation. The time-series data in the database 130 can be for both current and historical data.

A deal code record is a record of an investment idea that preferably minimizes risk exposure in the market. The deal code record can be an identifier, grouping, block, record, unit, content, or framework of data used in an investment or an investment idea. A deal code record can include data that identifies an investment or position in one or more primary financial instruments and can associate that data with data that identifies one or more related hedging financial instruments. A deal code record can associate the investments or positions to represent one or more strategies, including leverage, short or long positions, and arbitrage. In one example, a deal code record may include a long position in a first equity security and an associated short position in a second equity security.

A deal code record can identify one or more financial instruments or assets from different asset classes as well as the value (e.g., net value) or other information about those financial instruments. The financial instruments can include, but are not limited to, a note, corporate bond, municipal bond, stock, treasury stock, debenture, mutual funds, certificate of interest, certificate of deposit, derivative, commodity, currency, trust, put, call, straddle, option, investment in a partnership, investment in a limited liability corporation, fixed income security, equity or debt security, or any other type of security or investment. A deal code record can include more than just an identification of the type of asset or the particular asset. It can also include data regarding the actual investment or position. Accordingly, a deal code record stored in the database can include information identifying and associating one or more financial instruments and positions in each of the financial instruments. The use of deal code records can allow for a dollar-based performance value, which can be easier for a manager to utilize in assessing risk.

The deal code records can be based upon actual positions in a portfolio. As one alternative, deal code records can represent hypothetical positions for testing an investment idea of moderate conviction or other testing purposes. When using a hypothetical position, it may be useful to segregate the data in the database 130 so that the hypothetical deal code record does not affect any analysis of the actual positions. In one embodiment, the data representing actual positions can be duplicated in a test environment and the analysis can be executed using the hypothetical deal code records. In another embodiment, the deal code records can have a field that indicates whether the deal code record is hypothetical, and an analysis can provide an option whether to include no hypothetical deal code records, all hypothetical deal code records, or a subset of the hypothetical deal code records.

Table 1 below depicts an exemplary structure of a deal code record. This exemplary deal code record is illustrative of a convertible arbitrage strategy, though it is intended that the deal code record can be associated with any type of investment that includes at least one primary position and at least one hedging position. When creating a new deal code record for entry into the system 100, it may be initially believed that the new deal code record is independent of existing deal code records. Although not shown in this exemplary embodiment below in Table 1, the deal code record also includes actual positions in the various financial instruments, whereas conventional correlation analysis typically does not account for the amount actually invested.

TABLE 1

| PRIMARY INSTRUMENT | HEDGING INSTRUMENTS | HEDGE TYPE |
|---|---|---|
| Long Convertible Bonds of Ford Motor Company | Short Shares of Ford Motor Company Equity | Equity |
| | Long CDS ("bought protection") on Ford | Credit |
| | Short 3Y Treasury Bonds | Rate |

A deal code record can represent a single security or multiple securities. Accordingly, a system that uses deal code records differs from a conventional system whereby a single equity security is represented by an individual and unlinked record. When investing in an equity security, the investor has a single position for a single asset, and that investment may change in value over the course of time as, among other things, other investors in the market trade and value that equity security. The valuation of an equity security is typically based upon the last sale price on a primary exchange. In contrast, a deal code record identifies at least one primary instrument and may be associated with at least one hedging instrument, each of which may be a different type of instrument or from a different type of asset class. The tracking and valuation of a deal code record is, thus, more complex than tracking the price of a single equity security. Although the use of the last sale price from a primary exchange may be useful in tracking the price of a singe security, the last sale price from a primary exchange may not provide an accurate valuation of a deal code. So the valuation of a deal code record may also rely on dealer quotes, valuation services, models, and good faith estimates, and each type of instrument often requires a different type of valuation. Also, the state of instruments in a deal code record and the calculation of the value of the instruments in the deal code record are more dynamic and complex than the determination of a value of a position in a single equity. For example, a position on an instrument in a deal code record may periodically change, such as by changing the position from long to short or by changing the allocation in the particular position. In another example, new instruments may be added or removed from a deal code record. As a result, monitoring, valuing, tracking, comparing, and aggregating deal code records is much more complex than any analysis comparing two single financial instruments. Deal code records can be aggregated and tracked for purposes, including but not limited to, hedge adjustment, performance analysis, and risk analysis. As described herein, the identification and generation of deal code records can allow for a more accurate assessment of diversity in a portfolio, which cannot be accomplished by merely performing a correlation between price movements of two different assets. Accordingly, the user can better assess risk and hedge investments using deal code records.

Deal code records may be stored in the database 130. Each deal code record stored in the database 130 can include an identification of one or more primary positions (e.g., positions in primary instruments) and one or more hedging positions (e.g., positions in hedging financial instruments). The database 130 can store additional information in the deal code record or associated with the deal code record. The additional information can include, but is not limited to, instrument quantity, instrument type, purchase price, present market value, transaction type, date of transaction, detail of the positions, comments, custodial location, economics, financial instrument referential data, portfolio manager, deal code record identification, fund, firm strategy, sub-strategy, currency, industry sector, bond rating, domicile country, and financial instrument identifier. The database 130 can store investment performance data collected during the life or existence of a particular deal code record, so that a user, such as the portfolio manager or the manager, can query the database 130 to determine, in substantially real-time, the behavior of an investment position since inception.

The portfolio manager via computer 110 and the manager via computer 140 can communicate with the server 120 to add, modify, delete, transfer, associate, and update deal code records in the database 130. Financial data 150 imported into the server 120 can also be used to update or otherwise modify the deal code records in the database 130. The portfolio manager via computer 110 or the manager via computer 140 can search the database 130 for substantially real-time financial information or for historical data. Additionally, the data can be aggregated based on any of the available fields for all date ranges. For example, the database 130 can aggregate all deal code records based upon a particular portfolio manager, strategy, or profit and loss.

Figure 3:
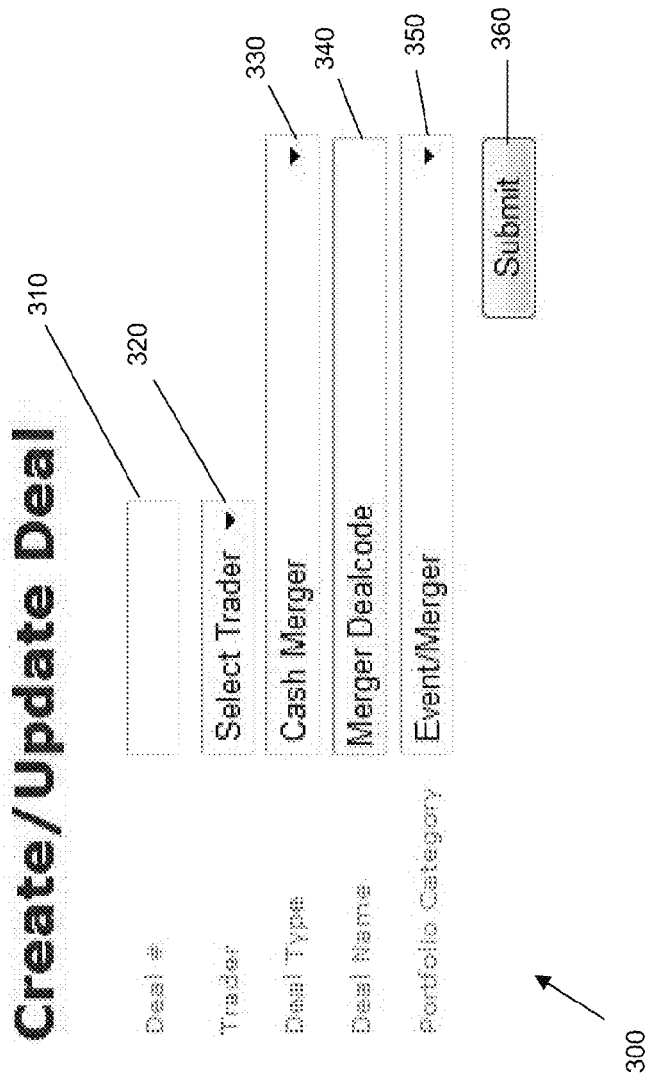
FIG. 3 depicts a graphical user interface according to an exemplary embodiment.

Referring to FIG. 3, a graphical user interface 300 for creating or updating a deal code record is shown. The graphical user interface 300 can be displayed on the computer 110 of the portfolio manager and can interact with the server 120. The graphical user interface 300 can receive inputs from the portfolio manager or manager of a deal number in field 310, a selected trader in drop-down menu 320, a selected deal type in drop-down menu 330, a deal name in field 340, and a selected portfolio category in drop-down menu 350. Once the form has been completed, the portfolio manager can click on the "submit" button 360 to enter the deal code record into the system 100. The server 120 will process the deal code record and store it in the database 130.

A deal code record can be active or inactive. An active deal code record has at least one non-zero position. In other words, a deal code record may be active when a position is held for a primary or hedging instrument in the deal code record. An inactive deal code record has all zero positions, and the economics contained within the positions represent the full realization of value obtained from the investment. An inactive deal code record can become active again, particularly if the investment that originally led to the creation of the deal code record is once again attractive. As positions within deal code records are updated, the status of the deal code records may change between active and inactive.

After a deal code record is created, the portfolio manager using computer 110 may modify a deal code record to adjust positions in a primary instrument and/or a hedging instrument. Reasons for modification can include, but are not limited to, changes in market conditions, portfolio manager's risk tolerance, or any other analysis. A position can be adjusted when the portfolio manager purchases or sells a primary instrument and/or a hedging instrument associated with that deal code record. When the portfolio manager posts a trade involving one of these associated instruments, the database 130 can record the trade and update the corresponding deal code record.

The server 120 can run a periodic (e.g., daily) or continuous (e.g., for real-time updates) query to determine whether the instruments of a deal code record have any non-zero positions and can update the status of the deal code accordingly. In one embodiment, the status can be represented as a "0" for inactive and a "1" for active. If a deal code record is inactive, then that deal code record will not have a meaningful relationship with any other deal codes and can be excluded from an analysis.

An exemplary process for managing investments using deal code records can be characterized according to (1) a filtering and construction stage, (2) a hedging stage, (3) an evaluation stage, and (4) a risk management stage. It is intended that these stages are merely exemplary. The exemplary method is not limited to the order of steps or stages described, and steps or stages may be omitted in some embodiments.

Each of the four stages of the system 100 can be implemented by a software module executed by a processor via one or more of the computer 110, server 120, computer 140, or a combination thereof. The first stage can be implemented in a filtering and collecting software module, the second stage can be implemented in a hedging software module, the third stage can be implemented in an evaluative and performance statistics software module, and the fourth stage can be implemented in a risk management software module. These modules can function together with the database 130 to provide data storage, evaluation, performance, and risk management of investment positions.

Figure 4:
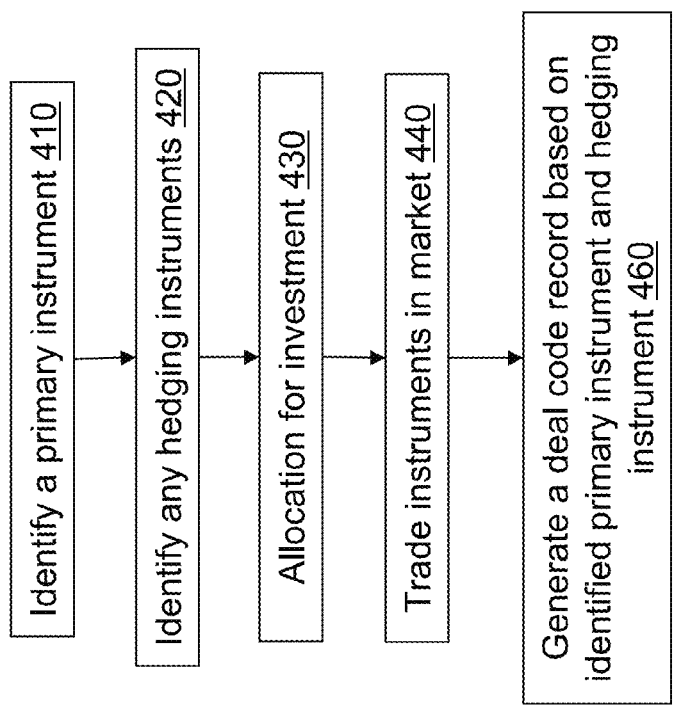
FIG. 4 depicts a method of forming and filtering deal code records according to an exemplary embodiment.

In a first stage, the portfolio manager uses computer 110 to create and establish or modify a deal code record. Referring to FIG. 4, upon identifying an investment idea, the portfolio manager can select one or more investments to add to a deal code record. For example, the portfolio manager can identify one or more primary instruments, in step 410, along with any initial hedging instruments, in step 420. The manager using computer 140 or the portfolio manager using computer 110 can provide advice and consider capital allocation for investing in the deal code record, and this allocation can be based upon evaluation of the risk of the investments and the confidence in and of the portfolio manager, in step 430. The selected instruments can be traded in the market, in step 440. A new deal code record can be established and stored in the database based upon the selected investment, in step 450.

Figure 5:
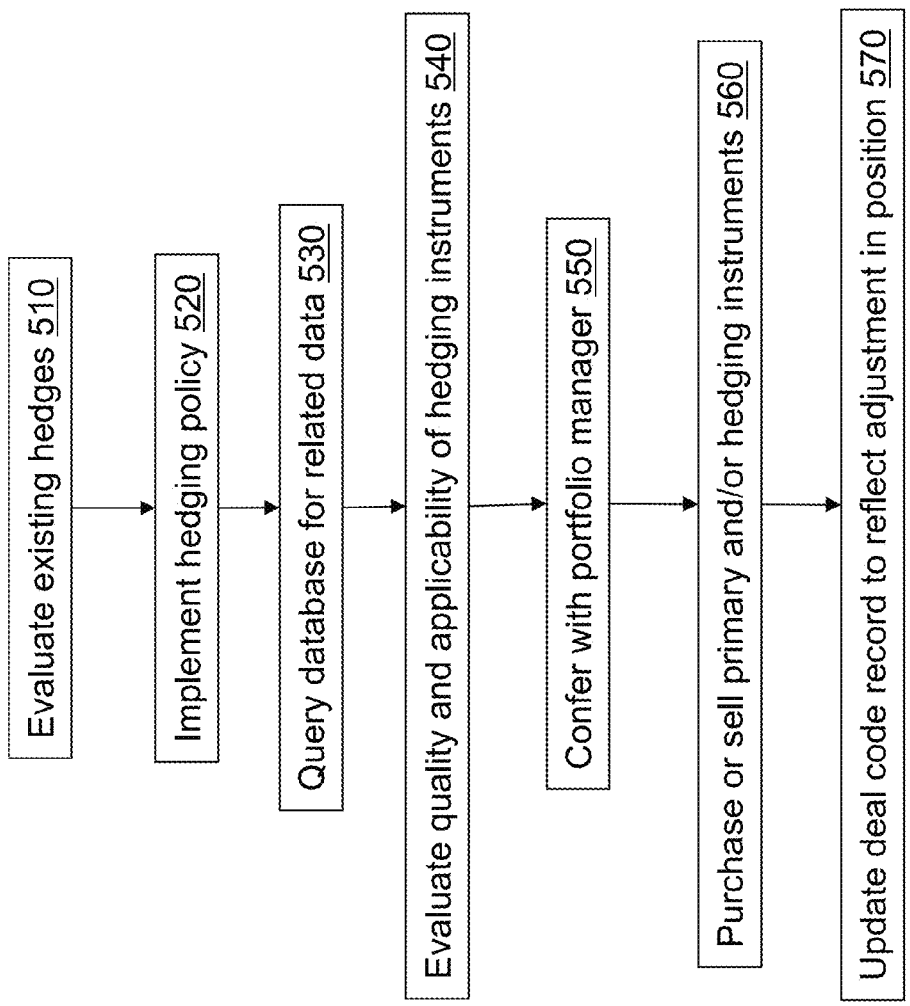
FIG. 5 depicts a method of adjusting positions in deal code records according to an exemplary embodiment.

In a second stage, the deal code record can be manually or automatically adjusted to reflect current positions of the instruments identified in the deal code record. When a deal code is active, market conditions or risk tolerance of the portfolio manager may necessitate position adjustments of one or more primary or hedging instruments, and the deal code record can be updated based upon the position adjustments. Referring to FIG. 5, a user may periodically evaluate the quality and applicability of existing hedges, in step 510. In some embodiments, the portfolio manager may perform this evaluation while booking new hedge trades. The portfolio manager can evaluate one or more existing hedges by selecting a particular deal code record, more than one deal code record, or a portfolio of deal code records. The manager, using computer 140, may also implement a firm-wide hedging policy based upon the particular deal code record, an evaluation, risk exposure, or any combination thereof, in step 520. This hedging policy may be implemented as business rules into the system for evaluation of deal code records. Such a hedging policy may apply to all deal code records or a subset of deal code records related to the policy. Based upon the selected deal code records and the hedging policy, the server 120 can query the database 130 for data relating to the hedging instruments in those deal code records, in step 530. Using the resulting data, the portfolio manager and/or manager can evaluate the quality of the hedging instruments and applicability of the hedging instruments, in step 540. Alternatively, this evaluation can be performed automatically by the system based upon one or more predetermined criteria. The manager can confer with the portfolio manager and guide the portfolio manager with respect to the firm's overall view on rates, credit, equity markets, and volatility, in step 550. The new hedge trades can include the purchase or sale of one or more primary and/or hedging financial instruments associated with the deal code record, in step 560. The adjustment in position is reflected in the deal code record with the booking of the new trades, and the adjustment becomes part of the historical record stored in the database 130, in step 570.

Figure 6:
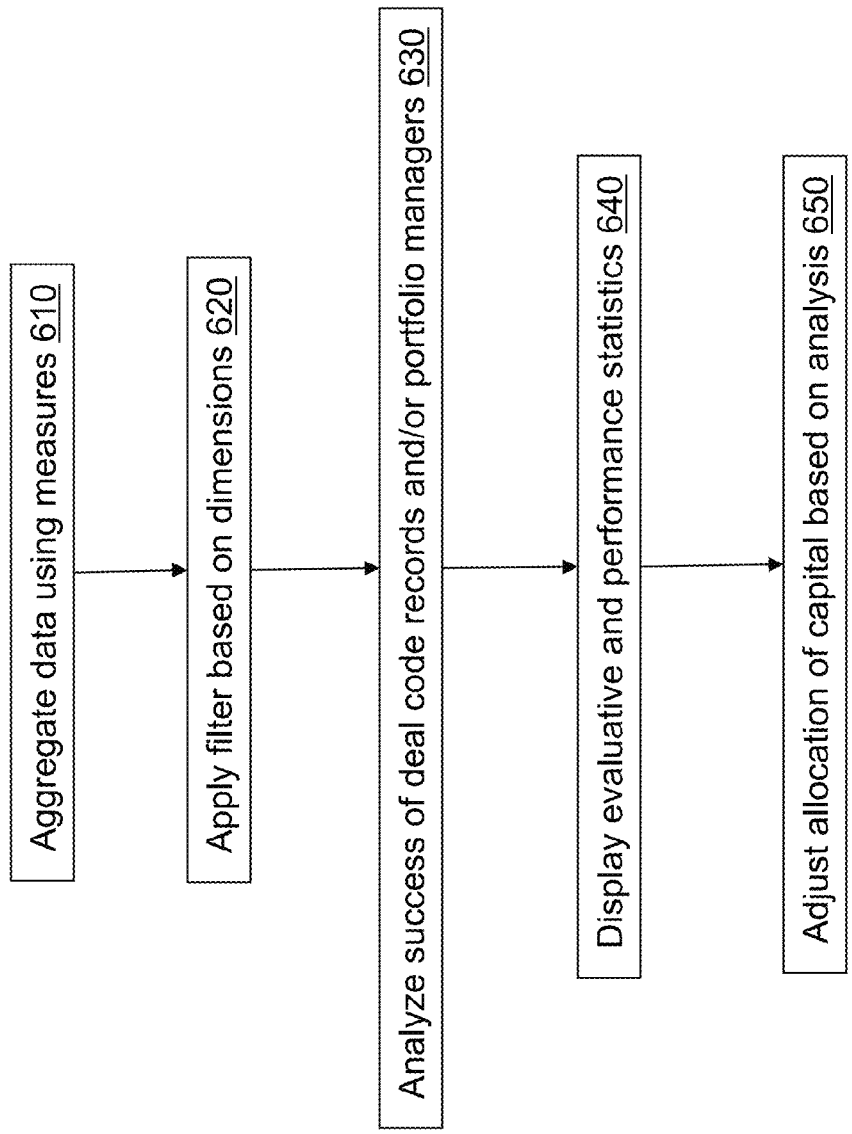
FIG. 6 depicts a method of evaluating performance according to an exemplary embodiment.

In a third stage, the deal code records can be evaluated. Referring to FIG. 6, the portfolio manager using computer 110 or the manager using computer 140 can submit a request to the server 120 to aggregate deal code record data using available measures in the database 130, in step 610. Measures can include, but are not limited to, profit and loss (e.g., based on day, month, year, since inception), market value, exposure, price, accrued interest, and cash-denominated sensitivities to valuation inputs. The portfolio manager using computer 110 or the manager using computer 140 can apply at least one filter to the deal code record data based on available dimensions, in step 620. Dimensions can include, but are not limited to, date or date range, portfolio manager, deal code record, fund, firm strategy and/or sub-strategy, financial instrument type, currency, industry sector, bond rating, domicile country, unique financial instrument identifier (e.g., Ticker symbol). Based upon these measures and dimensions, the manager can use computer 140 to analyze one or more deal code records and/or the absolute or relative success of each of the portfolio managers, in step 630. The manager can use computer 140 to execute an evaluative and performance statistics calculator as a part of this analysis. For example, the evaluative and performance statistics calculator can analyze time-series performance, average performance of a portfolio manager, exposure and leverage, and capital usage. The evaluative and performance statistics can be displayed, in step 640. The manager can then adjust the allocation of capital according to the analysis, in step 650. In some embodiments, the manager may adjust the allocation based upon the displayed statistics, which may further include indicators of diversity, profit and loss, or other factors related to risk or performance. Accordingly, the portfolio manager or the manager can measure the profit and loss per deal code record, across all deal code records, or across a subset of deal code records to detect combinations of primary and hedging instruments with performance parameters that match specified criteria, thereby allowing for detection of poorly-performing or well-performing deal code records. Alternatively, this detection can be performed automatically by the system based upon one or more predetermined criteria for automatically evaluating deal code records. In one embodiment, the system can enable an evaluation of an entire firm's performance, a department's performance, an investor's performance with more than one firm, or any subset of available deal code records. This method may also be useful to ascertain relationships between or among deal code records, or between or among clusters of deal code records.

In a fourth stage, the risk of one or more investments can be evaluated and appropriately managed. The system 100 can calculate the risk involved in one or more deal code records based on sensitivities to economic drivers, clustering analysis, covariance and correlation, and other approaches described herein.

Figure 7:
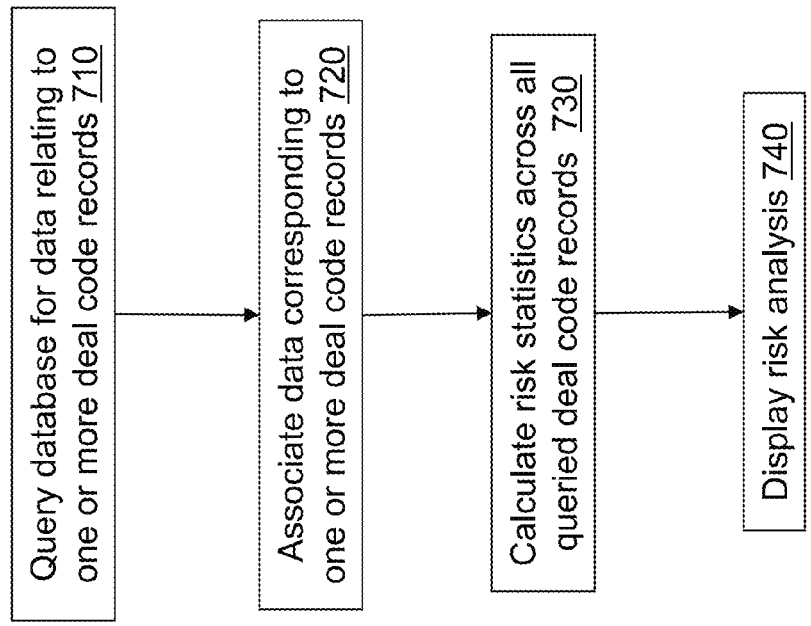
FIG. 7 depicts a method of calculating risk according to an exemplary embodiment.

Referring to FIG. 7, a method for calculating risk is shown. The portfolio manager can submit a request via computer 110 to the server 120 to query the database 130 for data relating to one or more deal code records, in step 710. For example, the portfolio manager may submit a request for all deal code records related to a specific strategy, such as convertible arbitrage. In one alternative, the system 100 can automatically and, optionally, periodically query the database 130. The system 100 can identify associated data that corresponds to the one or more deal code records, in step 720. For example, the system 100 can identify those deal code records that are associated with a certain portfolio manager, hedge type, or instrument type. The system 100 can then calculate risk statistics across all of the queried deal code records, in step 730. For example, the system 100 can calculate a diversity score for the deal code records that are associated with a particular strategy. The resulting risk analysis can then be displayed, in step 740. For example, a calculated diversity score can be displayed to a user to indicate which deal code records have a high diversity score and may benefit from additional attention by a manager.

The use of deal codes and storage of deal code records in the database 130 allows for cross-deal code record analysis, e.g., comparing multiple deal codes with each other. In this exemplary embodiment, at least two types of analysis may be performed, including clustering analysis, though it is understood that other types of statistical analysis may be performed.

Figure 8:
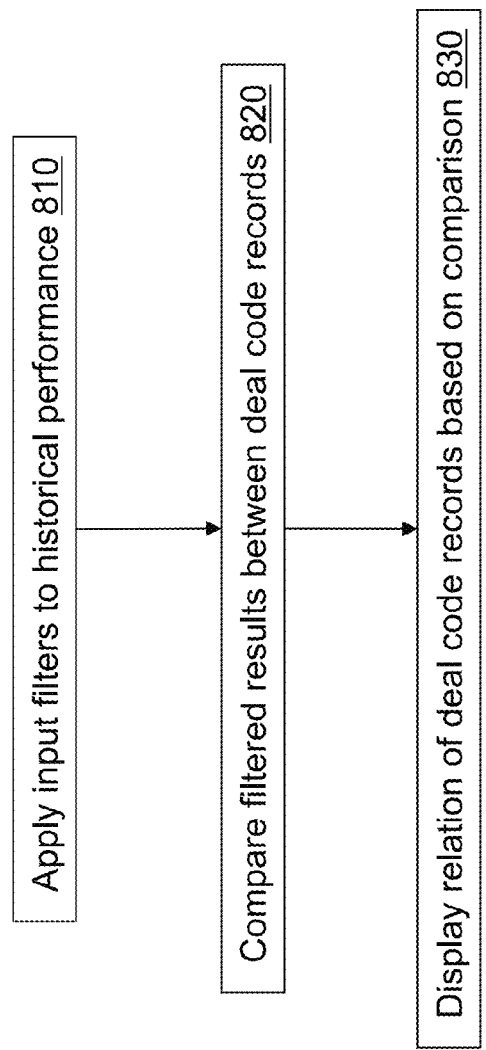
FIG. 8 depicts a method of calculating risk using clustering analysis according to an exemplary embodiment.

Clustering analysis can include determining the coordinated movements of multiple deal code records in terms of one or more measures. Referring to FIG. 8, this analysis can be performed using input filters, in step 810. In one embodiment, the input filter may specify both the number of observation periods and a threshold value that the measure must exceed to be considered as a qualifying event. For example, the analysis may consider measures from the last 10 days where the movement was over $50,000. For each of the deal code records in the analysis, the system 100 can then compare the filtered results of each deal code record to each of the other deal code records, in step 820. The results, which can be considered a frequency of similar behavior, can be used to determine the uniqueness, with regard to performance, of each deal code record when compared to the other individual deal code records in the analysis. In some embodiments, the deal code records can be compared to the performance of indices and other publicly-available metrics. The analysis of step 830 can be performed by computer 110, computer 140, server 120, or any combination thereof. The results can be displayed, in step 830. For example, computer 110 or computer 140 can present the comparison of deal code records.

Figure 9:
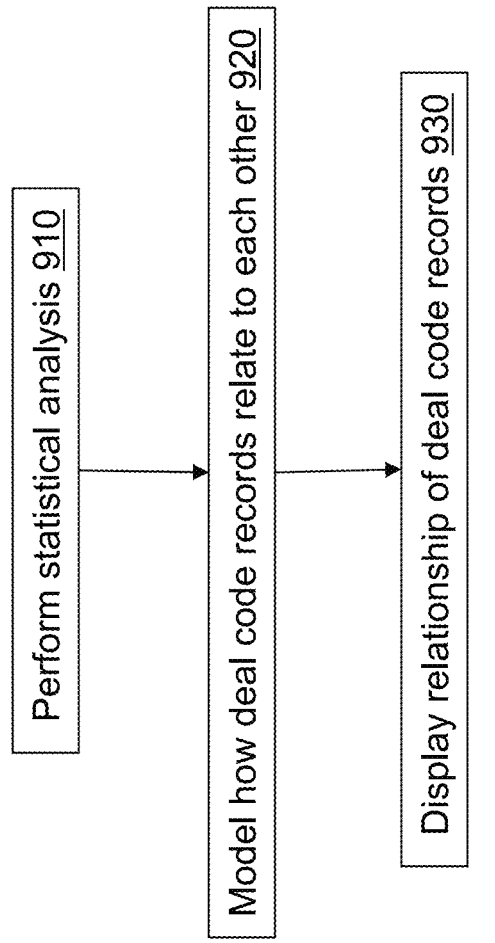
FIG. 9 depicts a method of calculating risk using regression analysis according to an exemplary embodiment.

Statistical analysis can be used to analyze one or measures across multiple deal code records, in step 910 of FIG. 9. Statistical analysis can be used to model how individual deal code records relate to other individual deal code records, in step 920. For example, the statistical analysis may compute any variables, parameters, and coefficients in determining the similarity between a first deal code and a second deal code. Similar to clustering analysis, other types of statistical analysis can be used to compare individual and collections of deal code records to indices or other metrics. This analysis can be performed using computer 110 or computer 140, either of which can perform this analysis or can access server 120, which can perform the analysis and provide the results for presentation to another computer, such as computer 110 or computer 140. The relationship of deal code records can be displayed, in step 930.

Clustering analysis or other statistical analysis can be conducted with the intention of maintaining a high degree of independence among the collection of deal code records. The analysis may suggest that the deal code record relationships meet certain generalized conditions. However, in some situations, analysis may suggest a relationship that falls between two of these conditions, and a variation on the input filters may assist with better defining the relationship. Once the system 100 identifies a condition, the system 100 can automatically notify the manager who can choose to adjust one or more positions in the deal code records. Alternatively, when system 100 identifies a condition, the system 100 may automatically adjust one or more positions in the deal code records.

In one type of condition, two or more deal code records may exhibit related performance over time. For example, deal code records may be highly-clustered and/or experience related changes in value. This condition may suggest that an initial assumption that the deal code records were distinct is false. Accordingly, a manager or portfolio manager can analyze and modify the deal codes records. In some situations, the deal code records may potentially be combined with or without adjustment in the sizes of the positions.

In another type of condition, the performance of two or more deal code records may be heavily dependent on an external measurable dimension. For example, two or more deal code records may exhibit performance related to an index or other external variable. Such a condition may suggest that certain deal code records are overexposed to a particular external factor. This condition may also suggest that the firm, in aggregate, has overly coordinated performance when compared to an external metric. This condition can, at a manager's discretion or automatically by the system 100, lead to a resizing of positions in deal code records or to a new hedging methodology to add or remove undesirable dependencies.

In yet another type of condition, groups of deal code records may exhibit related performance over time. For example, a collection of deal code records associated with one portfolio manager may exhibit performance related to a collection of deal code records associated with a second portfolio manager. A portfolio of investments may demonstrate excessive inter-firm performance grouping such that collections of deal code records from different portfolio managers are highly clustered. This condition can suggest that a desired independence across the performance of multiple portfolio managers is not being realized. In response to this condition, steps may be implemented to improve diversity across different portfolio managers.

The system 100 can present information for display on computer 110 for the portfolio manager or computer 140 for the manager regarding instrument identity, profit and loss data, price, quantity, and market value for each primary instrument and/or hedge instrument associated with a deal code record in the database 130. The portfolio manager or the manager can query the system 100 to analyze the performance of the active deal code records, and the system 100 can output this information for each deal code record.

In implementing the exemplary methods described herein, the computer 110, computer 140, server 120, or any combination thereof, can execute a module for monitoring risk (known as RMon by Hudson Bay Capital Management LP of New York, N.Y.). Results can be displayed on the computer 110 or the computer 140. Generally, the risk monitoring module can determine whether deal code records are related by comparing when two or more deal code records or a cluster of deal code records change in value in the same or opposite directions. The relationship between two or more deal code records, as described by the methods herein, is known as the "Gerber relationship." The Gerber relationship ignores data "noise" caused by an over-inclusion of historical data in favor of more immediate, significant data about the deal code records. Based upon the Gerber relationship, the risk monitoring module can provide a concise depiction of the diversity of a portfolio of investments to assist with predicting future strategies. In an attempt to mitigate risk, it can be desirable to efficiently identify the positions that are highly related in order to determine whether the associated investments should be more diversified.

Figure 10:
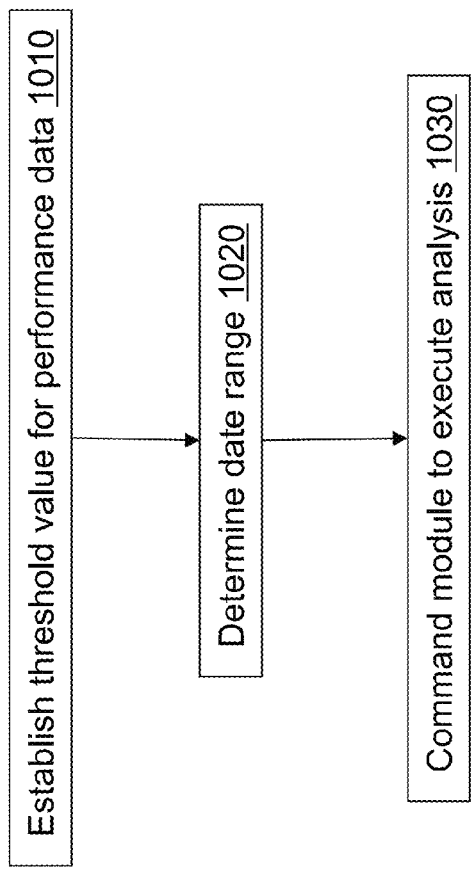
FIG. 10 depicts a method of using a risk monitoring module according to an exemplary embodiment.

An exemplary process for using the risk monitoring module follows, as shown in FIG. 10. In step 1010, once a threshold value is established, a filter will allow only deal code record performance data that exceeds the threshold value to be considered for the analysis. In this exemplary embodiment, the threshold value can be a magnitude (e.g., dollar amount, percentage) of a change in a value of performance data (e.g., a minimum amount of a gain or loss). In one example, the threshold value can be set at $100,000, so that the risk monitoring module will use only performance data that has increased or decreased by at least $100,000 during each time period. The threshold value can be selected to represent a significant move in the value of a position in order to filter out any insignificant "noise" in the variations of a position's value. For example, in a fund where positions are held in $1 million amounts, a deal code record experiencing a $10,000 unrealized gain or loss over a single day may be deemed insignificant. In one embodiment, a threshold value can be generally selected for all deal code records, and, optionally, each deal code record can have a threshold value specific to the strategy (e.g., volatility, distressed, convertible arbitrage) associated with that deal code record. The risk monitoring module can also set other parameters, such as length of a period, number of periods, and one or more indices. For example, in addition to the threshold value, the length of a period can also be specified by a user. The manager using computer 140 or a portfolio manager using computer 110 can select a threshold value or other parameters on a graphical user interface of the module. In one alternative, a threshold value can be set as a default or calculated by the system 100 based upon predetermined parameters (e.g., an acceptable level of risk specified by a manager).

In the exemplary embodiment, the risk monitoring module uses a threshold value for a profit or loss measured in a monetary amount as opposed to a percentage value, which is often used in conventional covariance analysis. Deal code record performance can be compared based upon the monetary profit and loss over time regardless of the size of the positions. By using a threshold value for the performance data, any period with a profit or loss beyond the threshold value can be included in the analysis. The analysis may count the number of periods when the change in value of any two deal code records were both beyond the threshold value and consider whether the changes were both profit, both loss, or one profit and one loss. For performance data representing a change in value beyond the threshold value, the risk monitoring module can summarize and display a percentage value between −100% and +100% that characterizes the Gerber relationship between the pair of deal code records. In some embodiments, this percentage value can represent the number of periods when the direction of the performance data of the pair of deal code records was the same and beyond the threshold value minus the number of periods that the performance data was beyond the threshold and in opposite directions, and the result can be divided by the number of periods that the performance data of both deal code records was outside the threshold value. In contrast, a conventional covariance analysis, usually calculated using a least squares regression, is generally run on percentage profit or loss so that investments of different sizes can be normalized. In an exemplary embodiment, the risk monitoring module uses dollar amounts, but the magnitude of the profit or loss is generally not considered as long as the change in value was beyond the threshold value. Further, only periods where both deal code records have performance data that was beyond the threshold value are considered. The risk monitoring module can calculate and display an indicator of the number of periods of performance data that exceeds the threshold value, a percentage value based on of the number of periods the deal code records moved in the same or different directions, and a color associated with the number of periods or the percentage value.

In an alternative embodiment, rather than using a monetary amount for changes in value, the risk monitoring module can use a percentage profit or loss of a deal code record in relation to a total value of the portfolio (e.g., the portfolio's net asset value). For example, the risk monitoring module can account for all of the positions in the deal code record in calculating a profit and loss value for the deal code record, and then divide by the value of the total portfolio. The use of a percentage profit or loss rather than a monetary amount profit or loss can be useful in assessing the exposure of a certain investment idea by determining its profit and loss in view of the entire portfolio.

Figure 11:
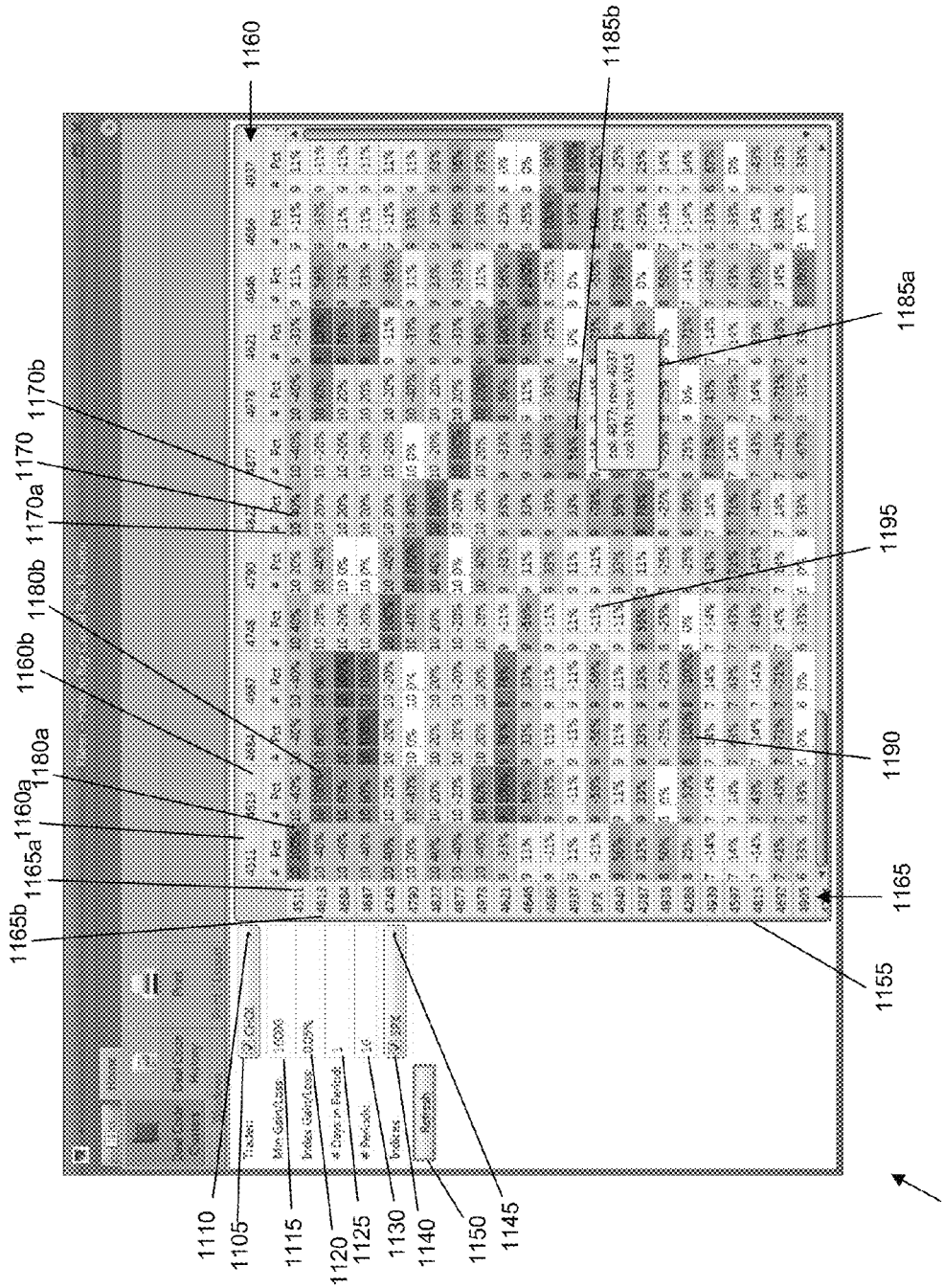
FIG. 11 depicts a graphical user interface according to an exemplary embodiment.

Referring to FIG. 11, a graphical user interface 1100 for interacting with the risk monitoring module is shown. Although the graphical user interface 1100 provides a plurality of options for selection, it is understood that any or all of these options can be set to a default value for the portfolio or a subset thereof (e.g., a default threshold value for each strategy or portfolio manager), manually adjusted to another value, or automatically adjusted based upon certain conditions. Also, although these options may be shown as fields, drop-down menus, or buttons, it is understood that the options may be presented in any form on the graphical user interface 1100, including radio buttons, check boxes, dials, or the like. The graphical user interface 1100 can include a field 1105 for identifying a trader or portfolio manager. Upon selection of an arrow 1110, a drop-down menu can be presented that allows for the selection of one or more traders. A field 1115 may allow for entry of a threshold value (e.g., minimum gain or loss). In this exemplary embodiment, the minimum gain or loss is shown as 10000, so the risk monitoring module will use only data in which there was a minimum gain or loss of at least $10,000. The minimum gain or loss may be adjusted based upon the size of the positions. For example, if a portfolio of investments has 50 positions of $10,000 each, the threshold may be set to a smaller minimum gain or loss than for a portfolio that has 50 positions of $1,000,000 each. A field 1120 may allow for the entry of an index gain or loss. In this exemplary embodiment, the index gain or loss is 0.05%. The manager can determine an acceptable level of risk and adjust the criteria (e.g., minimum gain/loss, time period) accordingly. Alternatively, the criteria can be set to a default or automatically adjusted by the system. These fields allow for dynamically adjusting the threshold value in the analysis of Gerber relationships. By adjusting one or more of these fields based upon an acceptable level of risk and the relevant types of investments, the user interface 1100 can be used for assessing various types of investments and refined to suit the particular user's needs.

In step 1020, a date range can be determined. The date range can include, but is not limited to, a single day, a three-day, 30-day, week, month, three-month, or other duration time period over which deal code record data is available. A period of time (e.g., how much historical data to view) can be selected along with a number of periods within that period of time. For example, a date range can be three months, and the three-month period can be viewed in three-day increments. In another example, the date range can be ten days, and the ten-day period can be viewed in one day increments.

On the graphical user interface 1100, a field 1125 can allow for entry of the number of days in a period. In this exemplary embodiment, the number of days in the period is set to 1. A field 1130 can allow for entry of the number of periods. In this exemplary embodiment, the number of periods is 10. Thus, in this example, the date range is ten days viewed in one-day increments. In an alternative embodiment, the graphical user interface 1100 can accept a selection of a length of time (e.g., 30 days) and a number of periods (e.g., 10 periods) and calculate the length of time in each period (e.g., 3 days).

The graphical user interface 1100 also can include an option to select one or more funds or indices (e.g., S&P 500, Dow Jones, NASDAQ, Spyder) using a button 1135. In response to selection of the arrow 1140, a drop-down menu may be provided that can allow the selection of various funds or indices, whereby one or more can be selected by checking a box corresponding to that fund or index. In this example, the selected index is shown as SPX, which is the Ticker symbol for the S&P 500. Once all of the appropriate selections have been made in the graphical user interface 1100, a refresh button 1150 can be selected to provide or update the results shown in a grid 1155. The submission can request that the module execute this analysis for display, in step 1030.

The risk monitoring module has software code that, when executed, can use the selections to generate a profit or loss value for each deal code record that meets the specified threshold value over the specified time periods. The risk monitoring module can use the incremental snapshots (e.g., daily or hourly) of deal code record profit or loss and produce a Cartesian product or chart of deal code record pairs, shown in this exemplary embodiment as grid 1155. The module can run a clustering analysis or other risk metric analysis native to the properties of a deal code record, an investment fund, or a portfolio of deal code records in order to calculate the relationships shown in this grid 1155. In conducting this analysis, the risk monitoring module can use a period of historical performance data (e.g., the past 50 days or past 10 days) and identify Gerber relationships between deal code records within that period. In one embodiment, the module can conduct statistical analysis (e.g., regression analysis), such as determining a coefficient of determination ($R^2$) for each correlated pair, an alpha ($\alpha$) for a measure of performance, and a beta ($\beta$) coefficient for a measure of volatility. The slope of this line can provide an internal beta that can be considered free of macro-market data. Alternatively, the risk monitoring module may use percentage profit and loss rather than a monetary amount for profit and loss, and the percentage profit and loss may be used in a statistical analysis (e.g., regression analysis) across each deal code record pair. In one embodiment, the statistical analysis may be performed using only those periods where the changes in value of both deal code records were beyond the threshold value.

The grid 1155 has an x-axis 1160 with a separate column for each deal code record 1160a, 1160b, . . . 1160n, and a y-axis 1165 with a separate row for each deal code record 1165a, 1165b, . . . 1165n. In addition to listing individual deal code records, the x-axis 1160 and the y-axis 1165 can also include an index or a grouping of deal code records. The intersection between a deal code record on the x-axis 1160 and a deal code record on the y-axis 1165 indicates the Gerber relationship between the two deal code records. The Gerber relationship can be shown as a number of periods when available performance data for both deal code records exceeds the threshold value, as shown by periods 1170a (e.g., ten periods available for the selected date range) of box 1170. The risk monitoring module can also show an indicator representing the similarity of movements across deal code records. For example, the risk monitoring module can provide a percentage value representing the number of periods where the two deal code records moved in the same direction minus the number of periods where the two deal code records moved in opposite directions, and that number is divided by the total number of periods exceeding the threshold, as shown in box 1170b (e.g., 40%). For example, a percentage of 40% may be the result of seven periods where the two deal code records moved in the same direction minus three periods where the deal code records moved in opposite directions, divided by ten periods that exceed the threshold criteria for that date range.

The grid 1155 can be arranged based upon the number of periods available 1170a for each deal code record comparison box 1170. For example, as shown in FIG. 11, those deal code record comparisons where 10 out of 10 periods have performance data satisfying the filter criteria (e.g., threshold value) can be displayed in the upper-left corner of the grid 1155. Those boxes having deal code record comparisons with the least amount of performance data satisfying the filter criteria can be displayed in the lower-right corner of the grid 1155. As a user views the boxes in a vertical direction from the top to the bottom of the grid 1155, the boxes have less performance data that meets the filter criteria. Similarly, as the user views the boxes in a horizontal direction from the left to the right of the grid 1155, the boxes have less performance data that meets the filter criteria. When considering historical data, it may be preferable to have a larger data set, as the analysis based on a larger data set can sometimes be more accurate. As a result, the boxes in the upper-left corner of the grid 1155 may be more reliable than the boxes in the lower-right corner of the grid 1155 because the boxes in the top-left corner can represent more performance data that meets the filter criteria and can better evaluate the Gerber relationship between two deal code records. The boxes in the lower-right may not have as many periods (e.g., six out of 10 or less) that have performance data meeting the filter criteria, so any relationship analysis is not based on as large of a data set and, thus, may not be considered as reliable. It is intended, however, that the arrangement of the boxes in the grid 1155 can be based upon any metric, result, order, or criteria, and is not limited to the arrangement based upon the periods as shown in this exemplary embodiment.

The deal code records listed in the x-axis 1160 can correspond to the deal code records listed in the y-axis 1165, so deal code record 1160a may be the same as deal code record 1165a, and deal code record 1160b may be the same as deal code record 1165*b*. As a result, a relationship analysis comparing a deal code record to itself (e.g., deal code record 1160*a* and deal code record 1165*a*) will always be 100%, as shown in the grid 1155 where the extent of relation 1180*a*, 1180*b*, . . . 1180*n* is listed as 100%. In this exemplary embodiment, these results can be designated with a blue box to distinguish them from other relationships between different deal code records.

A Gerber relationship between two deal code records can be a positive relation (e.g., both deal code records generally move in the same direction at the same time) or a negative relation (e.g., both deal code records generally move in opposite directions at the same time). A high positive relation or a high negative relation may signify that the two deal code records are not diverse from each other, and one or both of the deal code records may benefit from adjustments in allocations or other changes in investments. When two deal code records have a very low positive relation or a very low negative relation, the Gerber relationship may be deemed insignificant, and the deal code records may be considered sufficiently diverse. For example, the user can determine a threshold relation value (e.g., above 25% or below −25%) for whether two deal code records require additional attention.

As shown in this exemplary embodiment, the relation percentage between two deal code records can range from −100% to 100%. A value of relation of −100% may indicate that the two deal code records appear to have a high negative relation at the specified filter criteria (e.g., threshold value). This relation may be unfavorable for investments because it can indicate that the deal code records are dependent upon each other and, as a result, are not sufficiently diverse. A relation of 100% may indicate that the two deal code records appear to have a high positive relation for each period based upon the specified filter criteria (e.g., threshold value). The relation of 100% may be unfavorable for investments because it can indicate that the deal code records are heavily dependent upon each other or related to each other. A relation of 0% indicates that the two deal code records do not have any movements that qualify under the specified filter criteria, and these deal code records do not appear to be related in any manner. However, a value of relation of 0% may also represent that two deal code records moved in the same direction as many times as they moved in opposite directions. A value of relation on the scale of −100% to 100% represents an extent and direction of relation.

In instances of a Gerber relationship having a high negative relation or a high positive relation, one or both of the deal code records may require additional attention. However, deal code records with a high negative relation may not be considered as critical as those deal code records showing a high positive relation. For example, if a portfolio of investments includes several investments with a high positive relation indicating that the corresponding deal code records move in the same direction, then a loss in one investment is likely to result in a loss in the other investments. In contrast, if a portfolio includes a pair of investments with a high negative relation indicating that the corresponding deal code records move in opposite directions, then these investments may not be diversified, but nevertheless pose less risk because a loss in one investment is likely to accompany a gain in the other investment. In one embodiment, the system can automatically calculate the Gerber relationship and identify deal code records that satisfy a predetermined relation value.

As shown in this exemplary embodiment, relation values can be reflected through coloring. For example, the color of an indicator may represent the direction of the relation value (e.g., positive or negative) and the shading of the indicator may represent the extent of the relation value. In this exemplary embodiment, if the relation value is between −100% and 0%, the corresponding indicator can be colored green to signify the direction (e.g., the deal code records generally move in different directions) and shaded to signify the extent (e.g., how often the deal code records move in different directions) of a relation. A box having a relation of −100% can be colored vibrant green, a box having a relation of 0% can be colored white, and a box having a relation between these percentages can have a shade of green reflecting the extent of negative relation (e.g., −30% would have a lighter shade of green). In this exemplary embodiment, if the relation is between 0% and 100%, the corresponding indicator can be colored red to signify the direction (e.g., the deal code records generally move in the same direction) and shaded to signify the extent of a relation. A box having a relation of 0% can be colored white, a box having a relation of 100% can be colored vibrant red, and a box having a relation between these percentages can have a shade of red reflecting the extent of positive relation (e.g., 30% would have a lighter shade of red). By viewing the grid 1155, it can be easily apparent which boxes have a high positive or negative relation (e.g., those boxes shown as a brighter or more vibrant red or green), as well as which boxes have little to no relation (e.g., those boxes that are white or have minimal shading).

In one alternative, one end of the relation range (e.g., −100% or 100%) can be shaded with a first color, such as black, and the other end of the relation range can be shaded with a second color or absence of the first color, such as white, whereby a relation within the range can have a shading corresponding to the extent of relation. In another alternative, a color and/or shading may represent the absolute value of the relation value, so the range may extend from 0% to 100%, and a color may vary across that range. In this exemplary embodiment, a high positive relation is shown with red and a high negative relation is shown with green, so that attention may be drawn as a higher priority to the red boxes for most immediate attention. It is intended, however, that any type of relation (e.g., positive and/or negative relation) can be set as a priority, and any colors or indicia can be assigned to the relations based on the type of priority setting.

Although the exemplary embodiment recites the use of colors or shading for identifying relation between two or more deal code records, it is intended that any type of signal can be used. For example, the extent of relation can be a number in a range (e.g., 0 to 10, or 0 to 100), whereby one end of the range represents no relation and the other end of the range represents high relation. In another example, the extent of relation can be reflected in the size of the corresponding box or text, whereby two deal code records that have little relation will be represented by a small box or text, and two deal code records with high relation will be represented by a large box or text. The large box or text can be useful to draw the attention of the user to identify those items that may need adjusting. In an alternative embodiment, the relation can produce a value, and that value can be used by the system to automatically adjust positions in the portfolio.

In response to a user moving a cursor over any box or selecting any box with an input device, such as a keyboard, keypad, touchpad, touchscreen, or mouse, a window 1185*a* may be provided that can display information about the selected box. In this example, window 1185*a* can identify that a selected box 1185*b* represents the relation between deal code record 4877 for IVN (Ticker symbol for Ivanhoe Mines, Ltd.) and deal code record 4937 for NVLS (Ticker symbol for Novellus Systems, Inc.) Box 1185*b* shows that out of the last ten one-day periods, the database has performance data related to investments in IVN and NVLS meeting filter criteria for nine periods, and based on those nine periods, the system calculated a relation value of 56% because seven periods showed movement in the same direction while two periods showed movement in opposite directions. Accordingly, box 1185*b* can be shaded with red to indicate that these deal code records have a high positive degree of relation. In another example, as shown in box 1190, deal code record 4684 and deal code record 4288 have eight periods of performance data meeting the filter criteria (e.g., exceeding the threshold value), and during each of those eight periods, deal code record 4684 and deal code record 4288 moved in opposite directions. So this box 1190 is shaded with dark green to indicate that these deal code records have a high negative relation based on the filter criteria. In yet another example, as shown in box 1195, deal code record 4748 and the SPX index have nine periods of performance data meeting the filter criteria (e.g., exceeding the threshold value), and during those nine periods, deal code record 4748 and the SPX index had four periods showing movement in the same direction and five periods showing movement in opposite directions. Accordingly, this box 1195 is shaded with light green to indicate that the deal code record and index have only slight negative relation and, thus, are slightly diverse from each other.

The relationships shown in grid 1155 represent the Gerber relationship. The manager can use this graphical user interface 1100 to display grid 1155 to make further informed decisions about whether or to what extent the investments are truly diversified and to predict, model, or structure future true hedges. With the assistance of this tool, the manager can strive to obtain adequate diversification such that no single security, class of securities, or specific investment style will have a disproportionate impact on the aggregate investment results. The manager can identify clusters of profit and loss among deal code records with a focus on sector, strategy, or portfolio manager, and if significant clusters are related to a market beta, the manager can reduce position sizing and/or engage in portfolio-level hedging. The ability to monitor the diversity of the portfolio by deal code record on a periodic (e.g., daily) basis allows for a constant adherence to risk guidelines and limiting of loss exposure.

The cluster threshold analysis can be presented to the manager in various formats besides the exemplary embodiment shown in FIG. 11. Based on the Gerber relationships between various deal code records, the system can display on a user interface the extent of a relationship between two or more deal code records or the relationship of a deal code record to an index. The relationship can be depicted in a format whereby deal code records moving in the same direction and having a positive relation may be depicted differently (e.g., different size, color, or shape) than those deal code records moving in a different direction and having a negative relation. In one example, the user interface can present a treemapping of deal code record relation values, whereby the size of a nested rectangle can be indicative of the extent of a relationship between two deal code records, whereby deal code records represented by larger rectangles are more related to other deal code records than those deal code records represented by smaller rectangles. In one alternative, the treemapping of deal code record relationships can include only those deal code records having a positive relation or based on other criteria. In another example, the cluster threshold analysis can be presented in a cartographic generalization, whereby a geographic map is generated based on the relationships and elevation can represent an extent of a relationship. In yet another example, the cluster threshold analysis can be presented in a multi-layer Venn diagram, whereby overlapping sections can represent the extent of a relationship between deal code records. It is intended that any representation can be displayed, including the use of pictures, symbols, colors, and words, to show an extent of relationship between deal code records.

Deal code records can be used to determine their Gerber relationship with other deal code records to evaluate the diversity of a portfolio. In some instances, an investor or manager may stress a portfolio to determine how other deal code records will move if a particular action occurs. But this stress test may not utilize the previous and actual performance of the deal code records to determine diversity of investments. Instead, a stress test may only attempt to predict what could happen to a portfolio's return in the event of a particular scenario.

A diversity score can be calculated that represents an extent of relationship between two or more deal code records. For example, a point can be allocated to represent the direction and extent of a relation between two or more deal code records to generate a diversity score. Each deal code record can be allocated with a point for each instance where the deal code record has a negative relation value (i.e., generally moves in opposite directions) with respect to another deal code record. Deal code records can also be allocated with a fractional point for those negative relations that occur less than a hundred percent of the time (e.g., for a relation of −20%, a 0.2 can be awarded). Likewise, a negative point or fraction thereof can be applied each time a deal code record has a positive relation (i.e., generally moves in the same direction) with respect to another deal code record. The total points for a deal code record can be considered a diversity score, whereby a higher diversity score is more favorable for investments.

In one embodiment, a transfer file including the data collected by the system can be utilized by an internal books system to calculate per deal code record any suitable risk analysis information. For example, such risk analysis information can include delta ($\Delta$), vega ($\upsilon$), theta ($\Theta$), rho ($\rho$), lambda ($\lambda$) or omega ($\Omega$), gamma ($\Gamma$), and other known first and second order risk sensitivities, risk measures or hedge parameters. The internal books system can allow a user to assign risk limits (e.g., on a percentage or absolute basis) for each deal code record based upon any selected risk sensitivity, which may be selected by a portfolio manager or manager. For example, a base limit of 1% of fund value may be set, whereby no deal code record can surpass this limit in terms of loss without triggering a warning that is output to a graphical user interface of a computing device of a manager (e.g., computer 110) or portfolio manager (e.g., computer 140). The warning may be in the form of an alert pop-up or other suitable system to alert that the condition has been triggered.

In one embodiment, the system can use default settings or inputs for generating reports. For example, a set of inputs, such as those described above with respect to FIG. 11, can be used as a default setting. The system can execute a cluster threshold analysis based upon those inputs on a periodic basis and store the results of the cluster threshold analysis. The system can then generate reports based on the stored cluster threshold analysis. In one configuration, as the system automatically performs the cluster threshold analysis, the system can send an alert when the cluster threshold analysis identifies a relationship between two deal code records having certain criteria, such as a 100% positive relation.

In another embodiment, the system can generate filtered versions of reports based on predetermined report criteria. For example, the system may generate reports that only show the Gerber relationships that satisfy the report criteria. For example, a manager may view only deal code record relationships having a positive relation that is greater than 40%, so the system can present a graphical or tabular view of the deal code records that satisfy the 40% report criteria rather than providing information on the entire portfolio. For example, the filtered report may only show those deal code records that were shaded vibrant red in the embodiment shown in FIG. 11. In one embodiment, the system can automatically identify deal code records having a positive relation of a particular magnitude (e.g., 80%) and generate a report for those deal code records.

The use of deal code records allows a manager to review the profitability of each investment idea using various metrics based on the deal code records. For example, metrics can include a win/loss ratio of the number of profitable deal code records against the number of unprofitable deal code records. In another embodiment, a report generator module can query and process deal code record data into a report, such as a general fund-wide report or a portfolio manager report. Each report can include, but is not limited to, the top deal code records ranked by absolute profit, the bottom deal code records ranked by absolute loss, the top deal code records ranked by market value, the bottom deal code records ranked by market value, the top long market value positions, the bottom long market value positions. In one example, a treemapping report can present the magnitudes of profit/loss for each deal code record so that it is easily to visualize the most profitable or least profitable deal code records, which can also assist in determining an amount of exposure of the deal code records.

Figure 12A:
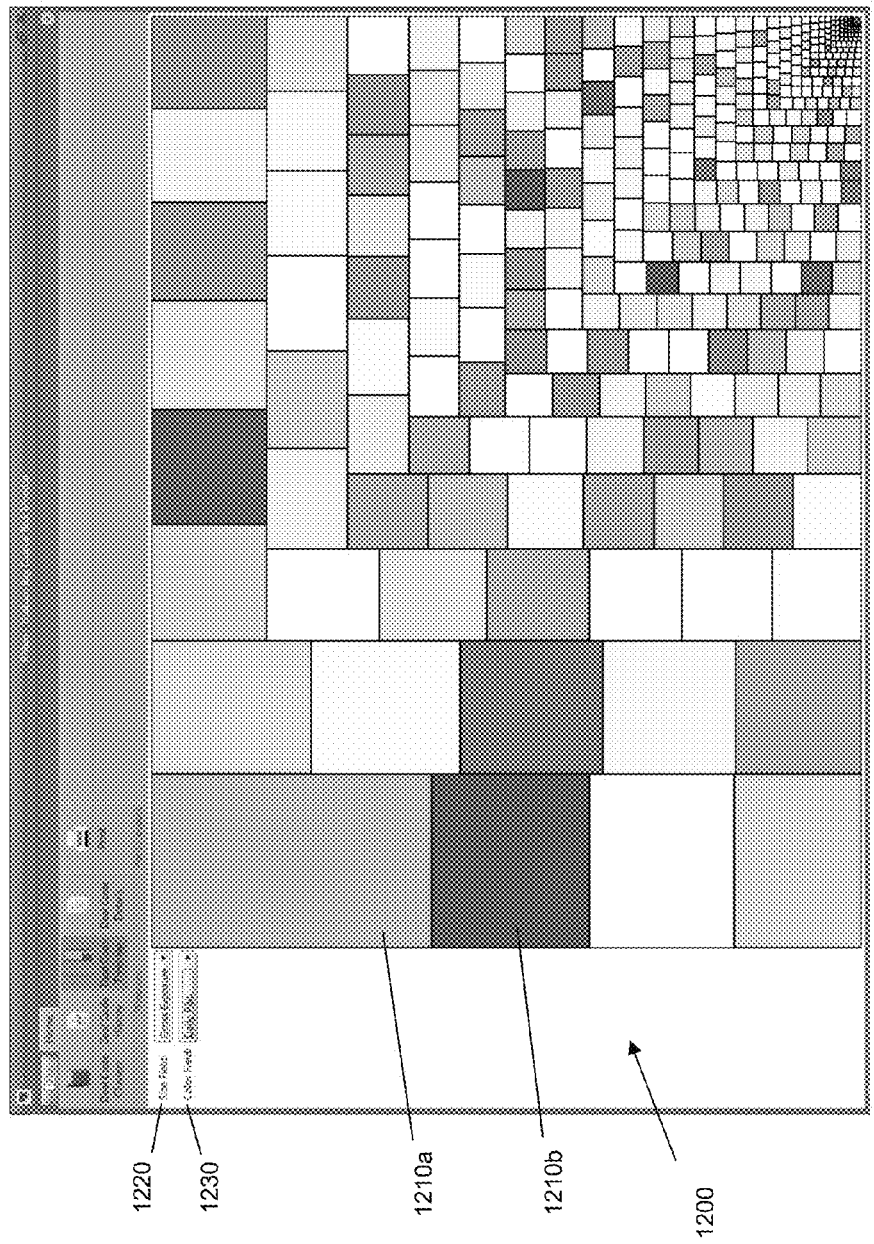

Referring to FIG. 12a, a treemap 1200 on a graphical user interface is shown, whereby each deal code record is represented by a rectangle 1210, and the size of nested rectangles 1210 is proportional to a selected dimension of the deal code record data. A dropdown menu for size field 1220 may allow a user to choose a dimension of the data that determines the size of the rectangles 1210. In this exemplary embodiment, the selected dimension is gross exposure, and the options can also include, but are not limited to, long exposure, absolute value of net exposure, absolute value short exposure, absolute value of profit and loss year to date, absolute value of profit and loss month to date, and absolute value of profit and loss daily. Using gross exposure, the rectangles 1210 can be sized proportionally to each deal code record's gross exposure data. Accordingly, larger rectangles represent deal code records with a greater gross exposure than smaller rectangles. For example, a deal code record represented by rectangle 1210a has a greater gross exposure than a deal code record represented by rectangle 1210b.

A dropdown menu for color field 1230 allows the user to choose which field to use for the color. In this exemplary embodiment, the selected field is daily profit and loss (P&L), and the options can also include, but are not limited to, year to date profit and loss and month to date profit and loss. A green color can represent a positive profit and loss, a red color can represent a negative profit and loss, and a white color can represent a zero profit and loss. Varying shades of green and red can be used to show magnitude of profit and loss. For example, the deal code record represented by rectangle 1210a has a green color, so this deal code record has a positive profit and loss during that daily period. The deal code record represented by rectangle 1210b has a red color, so this deal code record has a negative profit and loss during that daily period.

Referring to FIG. 12a, when a user positions a cursor over a rectangle 1210, clicks the rectangle 1210 or otherwise selects the rectangle 1210, a window 1240 may be provided with additional information about the deal code record represented by the rectangle 1210. The window 1240 can include information such as a deal code record name, associated trader, gross exposure, net exposure, long exposure, short exposure, daily profit and loss, month to date profit and loss, and year to date profit and loss. In this exemplary embodiment, the window 1240 can provide information about the deal code record represented by rectangle 1210a, such as a deal code record name XYZ, a trader name Gerber, a gross exposure of $230,696,899.95, a net exposure of ($48,174,487.45), a long exposure of $91,761,206.25, a short exposure of ($138,935,693.70), a daily profit and loss of $23,555.95, a month to date profit and loss of $612,649.10, and a year to date profit and loss of $2,302,715.36.

Each report can further categorize winning (i.e., profitable) and losing (i.e., unprofitable) deal code records to identify those that need further management. For example, a portfolio manager may desire to view the top ten most profitable deal code records of the day and the top ten most unprofitable deal code records of the day. In order to characterize a deal code record as a "win" or a "loss," a threshold value can be determined for measuring each deal code record. For example, the threshold value can be selected to query the database for all deal code records that gained or lost $20,000 during a predetermined interval (e.g., one day or a three-day period). The threshold value can be a positive or negative value and any date range may be used. The categorization of deal code records as a "win" or a "loss" can identify deal code records that may warrant further attention or management. Likewise, the report generator module may generate reports with respect to other risk analysis information, such as delta ($\Delta$), vega ($\upsilon$), theta ($\Theta$), rho ($\rho$), lambda ($\lambda$) or omega ($\Omega$), gamma ($\Gamma$), and other known first and second order risk sensitivities, risk measures or hedge parameters. Unlike conventional covariance analysis, the report can use actual monetary figures based on the positions in those deal code records, so a manager can evaluate a dollar-amount profit and loss for a deal code record, a portfolio manager, a portfolio, sector, strategy, or any other set or subset of the portfolio data. Because conventional methods do not utilize deal code records, those conventional methods cannot determine the profit and loss for a given time period on such an accurate basis.

A summary report can list the deal code records or group deal code records by a category (e.g., portfolio manager), condition (e.g., movement in same direction), or strategy (e.g., convertible, event/merger, volatility, and credit). For each category, condition, or strategy, the report can identify the number of wins and losses, as well as information including, but not limited to, a long market value, short market value, long premium, short premium, daily profit/loss, month-to-date profit/loss, and year-to-date profit/loss.

To measure the effectiveness of a portfolio manager, the system can produce a report to compare total portfolio performance against a target allocation benchmark and/or a weighted composite of the portfolio manager's individual benchmarks. The target allocation benchmark may uncover the value added by the portfolio manager's asset allocation and style biasing activities. The individual benchmark may emphasize the impact of the portfolio manager's selection.

A deal code record report can generate a list of deal code records that is sorted by portfolio manager. For each portfolio manager, the report can include statistics about that portfolio manager's deal code records. For example, such statistics may include average investment cost, median investment cost, best investment, worst investment, second best investment, daily profit, daily loss, month-to-date profit, month-todate loss, previous month profit, previous month loss, year-to-date profit, year-to-date loss, previous year profit, previous year loss, and any combination thereof. The deal code record report can also be sorted based on data associated with the deal code (e.g., average investment cost).

A trader summary report can generate a list of deal codes records associated with a particular portfolio manager, along with relevant statistics. For example, such statistics can include a portfolio manager's month-to-date win, month-to-date loss, long market value, short market value, long swap, short swap, daily profit/loss, month-to-date profit/loss, year-to-date profit/loss, and any combination thereof. A report can also be generated to see more detailed performance of each trader by showing the performance of each deal code record.

In one embodiment, a computer-implemented method of evaluating an investment comprises generating, using a computer, a first deal code record comprising an identification of a primary position for an investment; storing, using a computer, the first deal code record in a database; querying, using a computer, for performance data over historical periods regarding the primary position; determining, using a computer, whether performance data regarding at least the primary position during each historical period satisfies a profit and loss threshold value; determining, using a computer, a relationship between the first deal code record and a second deal code record based at least on performance data for the first deal code record that satisfies the threshold value and performance data for the second deal code record that satisfies the threshold value; and displaying, using a computer, an indication that represents the relationship.

In another embodiment, a computer program product, comprising a tangible computer readable medium having a computer readable program code embodied therein, the computer readable program code adapted to be executed to implement a method for evaluating an investment, the method comprises providing a system, wherein the system comprises distinct software modules, and wherein the distinct software modules comprise a construction module, a hedging module, an evaluation module, and a risk management module; generating, using the construction module, a first deal code record comprising an identification of a primary position for an investment; storing, using the construction module, the first deal code record in a database; querying, using the hedging module, for performance data over historical periods regarding the primary position; determining, using the evaluation module, whether performance data regarding at least the primary position during each historical period satisfies a profit and loss threshold value; determining, using the evaluation module, a relationship between the first deal code record and a second deal code record based at least on performance data for the first deal code record that satisfies the threshold value and performance data for the second deal code record that satisfies the threshold value; and displaying, using the risk management module, an indication that represents the relationship.

In yet another embodiment, a system for evaluating an investment comprises a processor; and a tangible computer-readable medium, the computer-readable medium comprising instructions that when executed by the processor perform the following: a processor; and a tangible computer-readable medium, the computer-readable medium comprising instructions that when executed by the processor perform the following: receive an input of a threshold value based on a minimum gain or loss for analysis; receive an input of a length of a historical period; receive an input of a number of historical periods; identify qualifying historical periods during which performance of a first investment was beyond the threshold value and performance of a second investment was beyond the threshold value; analyze a relationship between the first and second investments based on performance during the qualifying historical periods; and generate on a display an indicator of the relationship between the first and second investments.

In still yet another embodiment, a system for evaluating an investment comprises a processor; and a tangible computer-readable medium, the computer-readable medium comprising instructions that, when executed by the processor, generate on a user interface an indication showing a relationship between at least two deal code records based on a comparison of historical performance of the at least two deal code records that is above a predetermined threshold.

In another embodiment, a computer-implemented method of evaluating a relationship between a first investment and a second investment comprises generating, using a computer, a first deal code record comprising identifications of a primary position for a first investment and a hedge position for the first investment; storing, using a computer, the first deal code record in a database; generating, using a computer, a second deal code record comprising identifications of a primary position for a second investment and a hedge position for the second investment; storing, using a computer, the second deal code record in the database; querying, using a computer, for performance data over historical periods regarding the positions in the first and second deal code records; determining, using a computer, whether combined performance data regarding the first deal code record during each historical period satisfies a profit and loss threshold value; determining, using a computer, whether combined performance data regarding the second deal code record during each historical period satisfies the threshold value; determining, using a computer, a qualifying number of historical periods in which both the first and second deal code records demonstrate combined performance data that satisfies the threshold value; determining, using a computer, a relationship between the first deal code record and the second deal code record based at least on the number of qualifying historical periods; and displaying, using a computer, an indication that represents the relationship.

In yet another embodiment, a computer program product comprises a tangible computer readable medium having a computer readable program code embodied therein, the computer readable program code adapted to be executed to implement a method for evaluating a relationship between a first investment and a second investment comprises providing a system, wherein the system comprises distinct software modules, and wherein the distinct software modules comprise a construction module, a hedging module, an evaluation module, and a risk management module; generating, using the construction module, a first deal code record comprising identifications of a primary position for a first investment and a hedge position for the first investment; storing, using the construction module, the first deal code record in a database; generating, using the construction module, a second deal code record comprising identifications of a primary position for a second investment and a hedge position for the second investment; storing, using the construction module, the second deal code record in the database; querying, using the hedging module, for performance data over historical periods regarding the positions in the first and second deal code records; determining, using the evaluation module, whether combined performance data regarding the first deal code record during each historical period satisfies a profit and loss threshold value; determining, using the evaluation module, whether combined performance data regarding the second deal code record during each historical period satisfies the threshold value; determining, using the evaluation module, a qualifying number of historical periods in which both the first and second deal code records demonstrate combined performance data that satisfies the threshold value; determining, using the evaluation module, a relationship between the first deal code record and the second deal code record based at least on the number of qualifying historical periods; and displaying, using the risk management module, an indication that represents the relationship.

In still yet another embodiment, a system for evaluating a relationship between a first investment comprising a primary position and a hedging position and a second investment comprising a primary position and a hedging position comprises a processor; and a tangible computer-readable medium, the computer-readable medium comprising instructions that when executed by the processor perform the following: receive an input of a threshold value based on a minimum gain or loss for analysis; receive an input of a length of a historical period; receive an input of a number of historical periods; identify qualifying historical periods during which combined performance of the positions of the first investment was beyond the threshold value and combined performance of the positions of the second investment was beyond the threshold value; analyze the relationship between the first and second investments based on combined performance during the qualifying historical periods; and generate on a display an indicator of the relationship between the first and second investments.

Unless specifically stated otherwise as apparent from the following discussion, it is appreciated that throughout the description, discussions utilizing terms such as "creating," "providing," "calculating," "processing," "computing," "transmitting," "receiving," "determining," "displaying," "identifying," "presenting," "establishing," or the like, can refer to the action and processes of a data processing system, or similar electronic device, that manipulates and transforms data represented as physical (electronic) quantities within the system's registers or memories into other data similarly represented as physical quantities within the system's memories or registers or other such information storage, transmission or display devices. The system can be installed on a mobile device.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but not limited to, any type of disk including floppy disks, optical disks, CD-ROMs and magnetic-optical disks, read only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known non-transitory devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to the disclosure.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components can be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms "determine," "calculate" and "compute," and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A computer-implemented method of evaluating a relationship between a first investment and a second investment, the method comprising:

generating, using a computer, a first deal code record comprising identifications of a first position as a primary position for a first investment and a second position as a hedge position for the first investment;

storing, using a computer, the first deal code record in a database;

generating, using a computer, a second deal code record comprising identifications of a primary position for a second investment and a hedge position for the second investment;

storing, using a computer, the second deal code record in the database;

querying, using a computer, for performance data over historical periods regarding the positions in the first and second deal code records;

determining, using a computer, whether combined performance data regarding the first deal code record during each historical period exceeds a profit and loss threshold value;

determining, using a computer, whether combined performance data regarding the second deal code record during each historical period exceeds the threshold value;

determining, using a computer, a qualifying number of historical periods in which both the first and second deal code records demonstrate combined performance data that exceeds the threshold value;

determining, using a computer, a relationship between the first deal code record and the second deal code record based at least on the number of qualifying historical periods,
  wherein a relation value based on an extent of the relationship is calculated, using a computer, by subtracting a first value from a second value to obtain a third value, and dividing the third value by the total number of qualifying historical periods,
  the first value is a number of qualifying historical periods that combined performance data regarding the first deal code record indicates a change in the same direction as combined performance data regarding the second deal code record, and
  the second value is a number of qualifying historical periods that combined performance data regarding the first deal code record indicates a change in an opposite direction from combined performance data regarding the second deal code record; and
displaying, using a computer, an indication that represents the relationship.

2. The method according to claim 1, wherein:
the first investment belongs to a first asset class; and
the second investment belongs to a second asset class that is different from the first asset class.

3. The method according to claim 1, wherein:
the primary position for the first investment comprises a monetary amount;
the hedging position for the first investment comprises a monetary amount;
the primary position for the second investment comprises a monetary amount;
the hedging position for the second investment comprises a monetary amount; and
the profit and loss threshold value comprises a monetary amount.

4. The method according to claim 1, wherein determining the relationship further comprises determining an extent of the relationship based at least on the number of qualifying historical periods that combined performance data regarding the first deal code record represents a movement in the same direction as combined performance data regarding the second deal code record.

5. The method according to claim 1, further comprising adjusting, using a computer, the primary position of the first deal code record based at least upon the relationship.

6. The method according to claim 1, further comprising determining, using a computer, whether the relationship satisfies a predetermined report criteria, wherein displaying the indication that represents the relationship only occurs if the relationship satisfies the report criteria.

7. The method according to claim 6, wherein the report criteria comprises a minimum number of qualifying historical periods.

8. The method according to claim 1, wherein displaying the indication further comprises depicting the relationship between the first and second deal code records using a color indicating an extent of the relationship.

9. The method according to claim 1, wherein displaying the indication further comprises depicting the relationship between the first and second deal code records using the relation value based on the extent of the relationship.

10. The method according to claim 1, wherein displaying the indication further comprises:
displaying a grid comprising:
  a horizontal axis listing the first deal code record, the second deal code record and other deal code records; and
  a vertical axis listing each of the deal code records listed on the horizontal axis, wherein the deal code records are ordered on the horizontal and vertical axes based on the number of qualifying historical periods of each deal code record.

11. A computer program product, comprising a tangible computer readable medium having a computer readable program code embodied therein, the computer readable program code adapted to be executed to implement a method for evaluating a relationship between a first investment and a second investment, the method comprising:
providing a system, wherein the system comprises distinct software modules, and wherein the distinct software modules comprise a construction module, a hedging module, an evaluation module, and a risk management module;
generating, using the construction module, a first deal code record comprising identifications of a first position as a primary position for a first investment and a second position as a hedge position for the first investment;
storing, using the construction module, the first deal code record in a database;
generating, using the construction module, a second deal code record comprising identifications of a primary position for a second investment and a hedge position for the second investment;
storing, using the construction module, the second deal code record in the database;
querying, using the hedging module, for performance data over historical periods regarding the positions in the first and second deal code records;
determining, using the evaluation module, whether combined performance data regarding the first deal code record during each historical period exceeds a profit and loss threshold value;
determining, using the evaluation module, whether combined performance data regarding the second deal code record during each historical period exceeds the threshold value;
determining, using the evaluation module, a qualifying number of historical periods in which both the first and second deal code records demonstrate combined performance data that exceeds the threshold value;
determining, using the evaluation module, a relationship between the first deal code record and the second deal code record based at least on the number of qualifying historical periods; and
displaying, using the risk management module, an indication that represents the relationship,
  wherein displaying the indication comprises depicting the relationship between the first and second deal code records using a relation value based on an extent of the relationship,
  the relation value is calculated, using a computer, by subtracting a first value from a second value to obtain a third value, and dividing the third value by the total number of qualifying historical periods,
  the first value is a number of qualifying historical periods that combined performance data regarding the first deal code record indicates a change in the same direction as combined performance data regarding the second deal code record, and
  the second value is a number of qualifying historical periods that combined performance data regarding the first deal code record indicates a change in an opposite direction from combined performance data regarding the second deal code record.

12. The computer program product according to claim 11, wherein:
  the first investment belongs to a first asset class; and
  the second investment belongs to a second asset class that is different from the first asset class.

13. The computer program product according to claim 11, wherein:
  the primary position for the first investment comprises a monetary amount;
  the hedging position for the first investment comprises a monetary amount;
  the primary position for the second investment comprises a monetary amount;
  the hedging position for the second investment comprises a monetary amount; and
  the profit and loss threshold value comprises a monetary amount.

14. The computer program product according to claim 11, wherein determining the relationship further comprises determining an extent of the relationship based at least on the number of qualifying historical periods that combined performance data regarding the first deal code record represents a movement in the same direction as combined performance data regarding the second deal code record.

15. The computer program product according to claim 11, wherein:
  the method further comprises determining, using a computer, whether the relationship satisfies a predetermined report criteria;
  the report criteria comprises a minimum number of qualifying historical periods; and
  displaying the indication that represents the relationship only occurs if the relationship satisfies the report criteria.

* * * * *